(12) United States Patent
Murakami et al.

(10) Patent No.: US 11,592,303 B2
(45) Date of Patent: Feb. 28, 2023

(54) PROCESSING APPARATUS, PROCESSING METHOD, AND PROGRAM

(71) Applicant: TOYOTA JIDOSHA KABUSHIKI KAISHA, Toyota (JP)

(72) Inventors: Kunihiro Murakami, Okazaki (JP); Katsuhiko Sakakibara, Kariya (JP); Makoto Matsushita, Ichinomiya (JP); Junya Sato, Nagoya (JP); Kiyonori Yoshida, Toyota (JP); Tae Sugimura, Miyoshi (JP); Takashi Hayashi, Aichi-gun (JP); Jun Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/929,215

(22) Filed: Feb. 4, 2020

(65) Prior Publication Data
US 2020/0278211 A1    Sep. 3, 2020

(30) Foreign Application Priority Data
Feb. 28, 2019 (JP) .............................. JP2019-036027

(51) Int. Cl.
*G01C 21/34* (2006.01)
*G01C 21/36* (2006.01)
*B60W 60/00* (2020.01)

(52) U.S. Cl.
CPC ....... *G01C 21/343* (2013.01); *B60W 60/0011* (2020.02); *G01C 21/3614* (2013.01); *G01C 21/3617* (2013.01); *G01C 21/3682* (2013.01)

(58) Field of Classification Search
CPC ............. B60W 60/0011; G01C 21/343; G01C 21/3614; G01C 21/3617; G01C 21/3682
See application file for complete search history.

(56) References Cited

U.S. PATENT DOCUMENTS 5,682,469 A * 10/1997 Linnett ............... G06F 3/04817
345/473
6,282,489 B1    8/2001 Bellesfield et al.
(Continued)

FOREIGN PATENT DOCUMENTS

CN     104350736 A    2/2015
CN     107036615 A    8/2017
(Continued)

OTHER PUBLICATIONS

Machine Translation of JP2002287616A (Year: 2002).*

*Primary Examiner* — Faris S Almatrahi
*Assistant Examiner* — Sahar Motazedi
(74) *Attorney, Agent, or Firm* — Oblon, McClelland, Maier & Neustadt, L.L.P.

(57) ABSTRACT

A processing apparatus includes a control unit. The control unit is configured to acquire facility information containing an advertisement or publicity on a facility located along a travel route that a vehicle is scheduled to travel or a facility located within a predetermined range from the travel route, and, while the vehicle is traveling along the travel route, process an image of a first facility associated with the facility information or an image of a second facility present around the first facility based on the facility information and display the image of the first facility or the image of the second facility on a display provided in the vehicle.

11 Claims, 13 Drawing Sheets

(56) References Cited

U.S. PATENT DOCUMENTS

| | | | |
|---|---|---|---|
| 6,498,982 B2 | 12/2002 | Bellesfield et al. | |
| 2004/0128066 A1* | 7/2004 | Kudo | G08G 1/096838 |
| | | | 340/995.17 |
| 2007/0203643 A1* | 8/2007 | Ramaswamy | G01C 21/3679 |
| | | | 701/427 |
| 2017/0201709 A1* | 7/2017 | Igarashi | G06F 3/048 |
| 2017/0330034 A1 | 11/2017 | Wang et al. | |
| 2019/0005544 A1* | 1/2019 | Hong | G06Q 30/0265 |
| 2019/0086223 A1* | 3/2019 | Tanaka | G08G 1/096866 |
| 2019/0256105 A1* | 8/2019 | Parat | B60W 30/181 |
| 2020/0018976 A1* | 1/2020 | Van Wiemeersch | G06F 3/011 |
| 2020/0159251 A1* | 5/2020 | Iwasaki | G06Q 10/20 |

FOREIGN PATENT DOCUMENTS

| | | | |
|---|---|---|---|
| JP | 2002287616 A | * | 10/2002 |
| JP | 2005-195475 A | | 7/2005 |
| JP | 2017-204261 A | | 11/2017 |
| JP | 2018-24424 A | | 2/2018 |
| JP | 2018-169244 A | | 11/2018 |
| JP | 2018-205429 A | | 12/2018 |
| WO | 2018/230738 A1 | | 12/2018 |

\* cited by examiner

FIG. 7

OPERATION MANAGEMENT TABLE

| REGION ID | VEHICLE ID | SERVICE TYPE | OPERATOR ID | HUB ID | CURRENT POSITION | MOVING ROUTE | OPERATION STATUS |
|---|---|---|---|---|---|---|---|
| ... | ... | SHOP | ... | ... | ... | ... | ... |
| D000A | S0101 | PASSENGER TRANSPORT | aa | a1 | X1,Y1 | RR01 | OPERATING |
| | ... | ... | ... | ... | ... | ... | ... |
| | ... | DISTRIBUTION | ... | ... | ... | ... | ... |
| ... | ... | SHOP | ... | ... | ... | ... | RESTING |

FIG. 10

VEHICLE INFORMATION TABLE

| VEHICLE ID | OPERATOR ID | BOOKING ID | MOVING INFORMATION ||||| VEHICLE SIZE | NUMBER OF AVAILABLE PERSONS | HOURS OF OPERATION |
| | | | BOARDING POINT | DESTINATION POINT | PASSING POINT | SCHEDULED ROUTE | | | |
|---|---|---|---|---|---|---|---|---|---|
| ⋮ | ⋮ | ⋮ | ⋮ | ⋮ | ⋮ | ⋮ | ⋮ | ⋮ | ⋮ |
| ST1011 | aa | R1002 | ⋮ | ⋮ | Z1,Z2,…,Zn | R1 | W1,H1,D1 | 5 | 9:00-19:00 |
| ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ |

FIG. 11

BOOKING INFORMATION TABLE

| BOOKING ID | USER ID | SCHEDULED BOARDING POINT | SCHEDULED BOARDING DATE AND TIME | SCHEDULED ALIGHTING POINT | SCHEDULED ALIGHTING DATE AND TIME | PURPOSE | SCHEDULED EVENT | NUMBER OF PERSONS BOOKED | STATUS OF USE |
|---|---|---|---|---|---|---|---|---|---|
| ... | ... | ... | ... | ... | ... | ... | ... | ... | NOT YET |
| R1002 | U2001 | ... | 2018/11/21/09:00 | ... | 2018/11/21/16:30 | SIGHTSEEING (SEEING HISTORIC SITES) | SEEING THREE-STORIED PAGODA (FACILITY NAME) | 4 (FAMILY) | IN ACTION |
| ... | ... | ... | ... | ... | ... | ... | ... | ... | FINISHED |

FIG. 12

FACILITY INFORMATION TABLE

| FACILITY ID | GENRE | FACILITY ADDRESS | ADVERTISE-MENT ID | COMPOSITION DETAILS | ADVERTISE-MENT DATA | DISPLAY DURATION | BONUS INFORMATION | FACILITY NAME | URL |
|---|---|---|---|---|---|---|---|---|---|
| ⋮ | ⋮ | ⋮ | ⋮ | ⋮ | ⋮ | ⋮ | ⋮ | ⋮ | ⋮ |
| S2011 | SIGHT-SEEING (HISTORIC SITES) |  | T001a | FACILITY GUIDE | ⋮ | ⋮ | ⋮ | ⋮ | https:// abcd. efg. ⋮ |
|  |  |  | T001b | STROLL 1 | ⋮ | ⋮ | ⋮ |  |  |
|  |  |  | T001c | STROLL 2 | ⋮ | ⋮ | ⋮ |  |  |
|  |  |  | T001d | EVENT | ⋮ | 2018/11/01-2018/11/30 | BOOKMARK |  |  |
| ⋮ | ⋮ | ⋮ | ⋮ | ⋮ | ⋮ | ⋮ | ⋮ | ⋮ | ⋮ |

# PROCESSING APPARATUS, PROCESSING METHOD, AND PROGRAM

INCORPORATION BY REFERENCE

The disclosure of Japanese Patent Application No. 2019-036027 filed on Feb. 28, 2019 including the specification, drawings and abstract is incorporated herein by reference in its entirety.

BACKGROUND

1. Technical Field

The disclosure relates to a processing apparatus a processing method, and a program.

2. Description of Related Art

Hitherto, various suggestions have been made about autonomous vehicles that are driven in autonomous mode (for example, unmanned driving or autonomous driving). For example, systems and methods for providing augmented virtual reality contents in autonomous vehicles have been suggested.

SUMMARY

The disclosure not only provides mobility with a vehicle but also further effectively provides information for a passenger of the vehicle.

An aspect of the disclosure is illustrated as a processing apparatus. The processing apparatus includes a control unit. The control unit is configured to acquire facility information containing an advertisement or publicity on a facility located along a travel route that a vehicle is scheduled to travel or a facility located within a predetermined range from the travel route, and, while the vehicle is traveling along the travel route, process an image of a first facility associated with the facility information or an image of a second facility present around the first facility based on the facility information and display the image of the first facility or the image of the second facility on a display provided in the vehicle.

Another aspect of the disclosure is illustrated as a processing method. The embodiment may be implemented as a processing method that includes acquiring facility information containing an advertisement or publicity on a facility located along a travel route that a vehicle is scheduled to travel or a facility located within a predetermined range from the travel route, and, while the vehicle is traveling along the travel route, processing an image of a first facility associated with the facility information or an image of a second facility present around the first facility based on the facility information and displaying the image of the first facility or the image of the second facility on a display provided in the vehicle.

Further another aspect of the disclosure is illustrated as a program to cause a computer to execute. The embodiment may be implemented as a program for causing a computer to execute instructions for acquiring facility information containing an advertisement or publicity on a facility located along a travel route that a vehicle is scheduled to travel or a facility located within a predetermined range from the travel route, and, while the vehicle is traveling along the travel route, processing an image of a first facility associated with the facility information or an image of a second facility present around the first facility based on the facility information and displaying the image of the first facility or the image of the second facility on a display provided in the vehicle, or a non-transitory computer-readable storage medium storing the program.

According to the disclosure, it is possible to not only provide mobility with a vehicle but also further effectively provide information for a passenger of the vehicle.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a table that shows an example of operation management information stored in an operation management DB;

FIG. 10 is a table that shows an example of vehicle information stored in a moving vehicle DB;

FIG. 11 is a table that shows an example of booking information stored in a booking information DB;

FIG. 12 is a table that shows an example of facility information stored in a facility information DB;

DETAILED DESCRIPTION OF EMBODIMENTS

Figure 1:
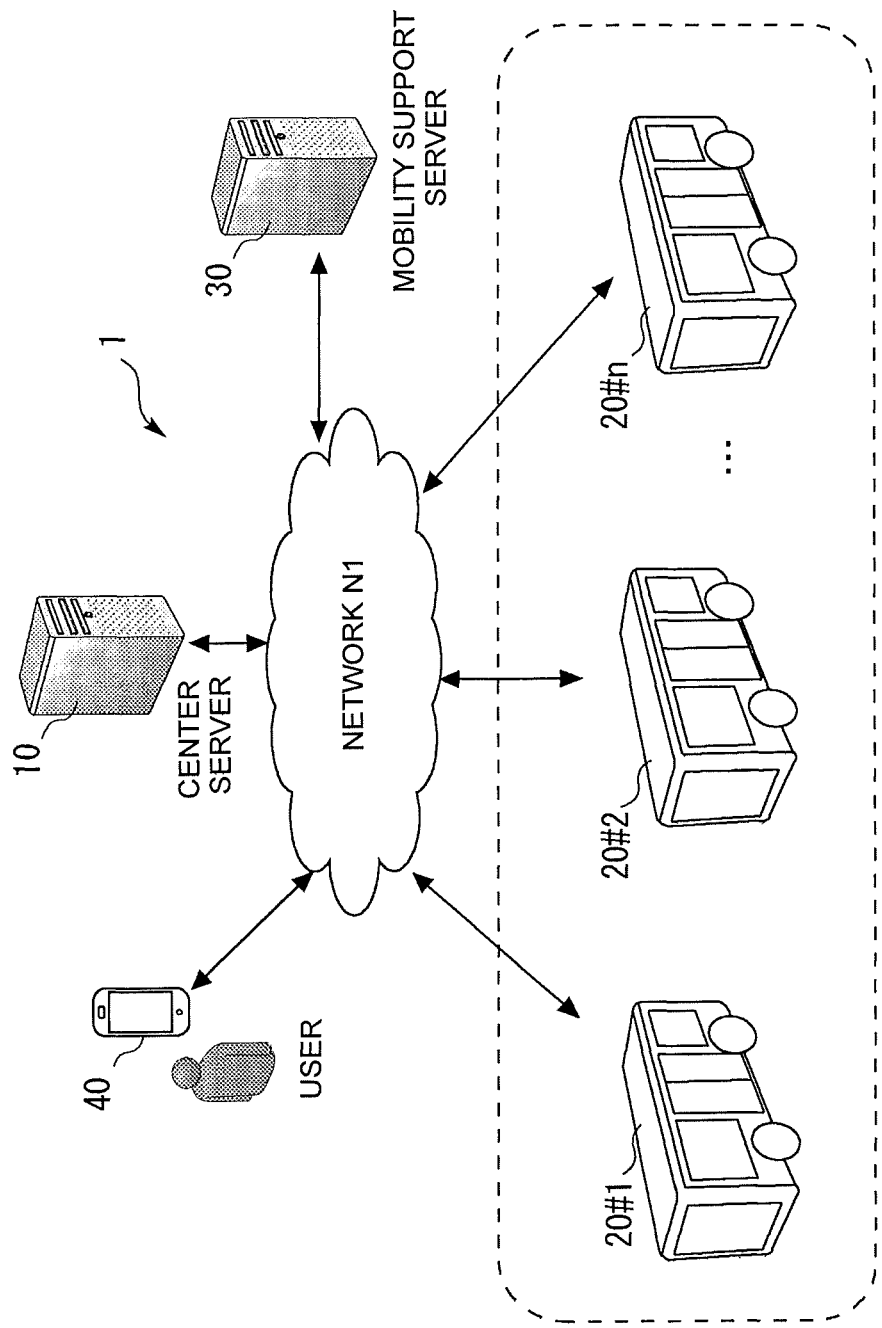
FIG. 1 is a diagram that shows an example of the system configuration of a mobility support system according to a first embodiment.

In an embodiment, a processing apparatus is provided in a vehicle, and displays various pieces of information on a display of the vehicle. The processing apparatus acquires facility information containing an advertisement or publicity on a facility (such as a shop and a building) located along a travel route that a vehicle is scheduled to travel or a facility located within a predetermined range from the travel route. While the vehicle is traveling along the travel route, the processing apparatus processes an image of a first facility (shop) associated with the facility information or an image of a second facility (building for sightseeing) present around the first facility based on the facility information and displays the image of the first facility or the image of the second facility on a display provided in the vehicle.

The facility is, for example, a commercial facility, such as a shop located along the travel route, a building, or the like.

The facility is also a sightseeing facility, such as a park, a theme park, an amusement park, a zoo, an aquarium, a temple, and a shrine. The first facility is a commercial facility, such as a shop. The second facility is a building present around a commercial facility, such as a shop, a sightseeing facility, or another facility.

The facility information is information that is used to augment a real world seen from people by adding information to a real environment, such as the image of the first facility and the image of the second facility present around the first facility, deleting information from the real environment, highlighting the real environment, attenuating part of the real environment, or modifying part of the real environment. The facility information is used to propagate the first facility or the second facility, to advertise the first facility or the second facility, or to publicize the first facility.

The processing apparatus enhances the effectiveness of propagation, advertisement, or publicity with the image of the first facility by using the processed image of the first facility. The processing apparatus may process the image of the second facility present around the first facility and display the second facility, instead of processing and displaying the image of the first facility. With such a process, the processing apparatus is able to effectively propagate, advertise, or publicize a facility located along the travel route. In addition, by, for example, propagating not only the first facility but also the second facility, the effectiveness of propagation, advertisement, or publicity for the first facility itself is enhanced. This is because there is an increased possibility that a user who gets interested in the second facility visits not only the second facility but also the first facility.

Processing and displaying the image of the first facility or the image of the second facility may include modifying a structure of the first facility or second facility through predetermined image processing, and a control unit of the processing apparatus may adjust a degree to which the structure is modified through the predetermined image processing upon receiving input from a user. With such a process, the processing apparatus is able to provide information adapted to user's preferences.

The processing apparatus may be a processing apparatus provided in a vehicle that a user who is scheduled to be involved in a predetermined event rides. The thus configured processing apparatus just needs to acquire event information about the event that the user who rides the vehicle is scheduled to be involved in, process the image of the first facility (shop) or the image of the second facility (building for sightseeing) based on the event information, and display the image of the first facility or the image of the second facility. With such a process, the processing apparatus is able to effectively propagate the first facility or the second facility, advertise the first facility or the second facility, or publicize the first facility or the second facility for the user who participates in the event.

The display may be placed on an entire surface or part of a surface of an internal space of the vehicle, and the control unit of the processing apparatus may acquire first information about an acceleration of the moving vehicle and control an image to be displayed on the display such that a user in the vehicle experiences an acceleration in a direction different from a direction of the acceleration indicated by the first information. With such a process, the processing apparatus is able to make the user experience a physical effect on the body and also propagate, advertise, or publicize the first facility or the second facility.

Hereinafter, one embodiment will be described with reference to the accompanying drawings. The configuration of the following embodiment is illustrative, and embodiments are not limited to the configuration of the embodiment that will be described below.

First Embodiment

Outline of System

FIG. 1 is a diagram that shows an example of the system configuration of a mobility support system 1 according to a first embodiment. The mobility support system 1 of FIG. 1 functions as a complementary system that cooperates with part of a mobile unit system that provides a service by causing mobile units, such as vehicles that are able to travel autonomously, to function for multiple purposes, or the mobile unit system.

First, the outline of the mobile unit system will be described. The mobile unit system is made up of a plurality of mobile units 20 #1, 20 #2, . . . , 20 #n and a center server 10. Each of the mobile units 20 #1, 20 #2, . . . , 20 #n is, for example, a vehicle that is able to travel autonomously on a road based on a received command. The center server 10 issues the command. Depending on users via user terminals 40 or various needs of any user, the mobile units provide mobility services, such as moving of the users, transportation of baggage, sales of goods, and services. The mobile units, the center server 10, and the mobility support server 30 are connected to one another through a network N1. Hereinafter, mobile units, such as vehicles that are able to travel autonomously, are also simply referred to as vehicles, and the mobile units 20 #1, 20 #2, . . . , 20 #n are also collectively referred to as vehicles 20.

For example, a self-propelled electric vehicle called electric vehicle (EV) pallet is illustrated as each of the vehicles 20. Each vehicle 20 may be an internal combustion engine vehicle that operates on power generated by an internal combustion engine, such a gasoline vehicle and a diesel vehicle, or a fuel cell vehicle (FCV) that operates on electric power supplied from a fuel cell using hydrogen, or another vehicle. The exterior and/or interior of the vehicle 20 can be changed according to a use or purpose of a mobility service to be provided, and the vehicle size can be selected optionally.

Figure 2:
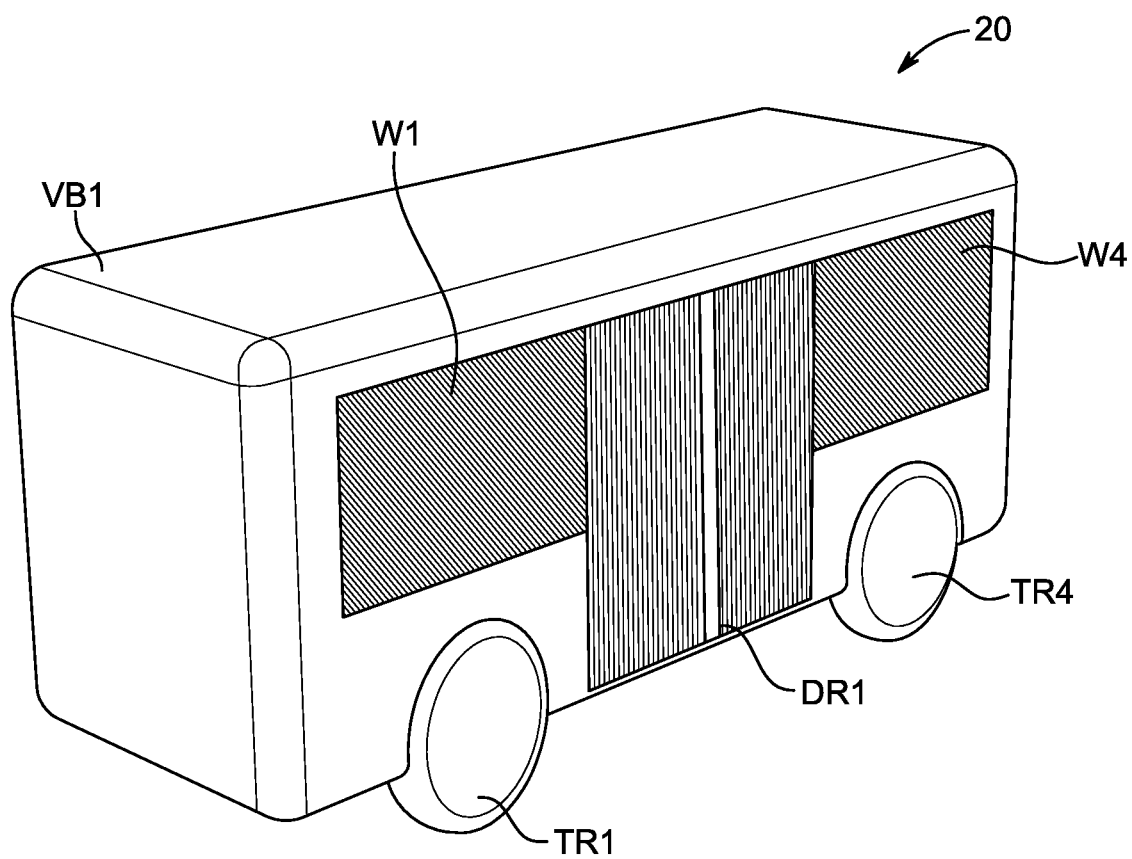
FIG. 2 is a perspective view that shows an example of the appearance of a vehicle.

FIG. 2 is a perspective view that illustrates the appearance of the vehicle 20. The vehicle 20 illustrated in FIG. 2 is an example of the mobile unit that employs an EV pallet as a configuration form. The vehicle 20 that employs the EV pallet has, for example, a box-shaped body VB1, and four wheels TR1, TR2, TR3, TR4 provided at the front and rear in a direction of travel on both sides under the body VB1. The four wheels TR1, TR2, TR3, TR4 each are coupled to a drive shaft and driven by a drive motor that is a component of a drive unit 23 illustrated in FIG. 8. Similarly, the direction of travel of the four wheels TR1, TR2, TR3, TR4 while traveling is relatively changed by a steering motor included in a steering mechanism that is a component of the drive unit 23, so the direction of travel of the vehicle 20 is controlled. In FIG. 2, an orientation in which windows W1, W4 and a door DR1 for boarding or alighting are provided on the left side of the body VB1 is a vehicle orientation that indicates the orientation of the vehicle 20.

Referring back to FIG. 1, the center server 10 is an apparatus that manages the vehicles 20 that make up the mobile unit system. The center server 10 cooperates with the mobility support server 30 to issue operation commands to the vehicles 20. Each vehicle 20 creates an operation plan upon receiving an operation command from the center server 10 and autonomously travels to a destination in accordance with the operation plan. Each vehicle 20 includes an acquiring unit that acquires positional information (such as latitude and longitude) of the host vehicle and sends positional information acquired at predetermined time intervals to the center server 10 and the mobility support server 30. The user terminal 40 is a small computer that a user can carry, such as a smartphone, a tablet terminal, and a wearable computer (such as a smart watch). However, the user terminal 40 may be a personal computer (PC) that is connected to the mobility support server 30, or the like, via the network N1.

The network N1 is, for example, a public network, such as the Internet. However, the network N1 may include a wireless network for wireless communication, such as Wi-Fi (registered trademark), a wireless network of a cellular phone network, such as LTE, LTE-Advanced, and 3G, a dedicated network, such as virtual private network (VPN), and a network, such as local area network (LAN). FIG. 1 typically illustrates the single center server 10, the single mobility support server 30, the single user terminal 40, and the plurality of vehicles 20 #1, 20 #2, . . . , 20 #n. A plurality of the center servers 10, a plurality of the mobility support servers 30, and a plurality of the user terminals 40 can be connected to the network N1.

In the mobile unit system to which the mobility support system 1 according to the present embodiment is applied, the vehicles 20 function as passenger vehicles that provide mobility services for the purposes or uses of users. For example, each vehicle 20 periodically travels along a predetermined route in a region to provide a service or moves to a boarding point booked through the user terminal 40 to pick up the user and then moves to a destination designated by the user. The vehicles 20 each are equipped with a sofa(s), a table(s), a display(s), and an input terminal(s) for designating or operating display information to be displayed on the display(s), for providing a mobility service inside the vehicle. The vehicles 20 each are not necessarily unmanned. A service staff(s), a security staff(s), or the like, for providing a mobility service to users may be in the vehicle 20. The vehicles 20 each are not necessarily a vehicle that constantly travels autonomously. For example, the vehicles 20 each may be a vehicle that the above-described staff(s) drive(s) or assist(s) in driving depending on a situation. The vehicles 20 each are not necessarily the one owned by an operator that provides a mobility service and each may be a vehicle individually owned by a user.

The mobility support system 1 according to the present embodiment includes the vehicles 20 and the mobility support server 30. The mobility support server 30 manages vehicle information about each vehicle 20, user information about each user who uses a mobility service that uses the vehicle 20, and booking information about a boarding booking of the vehicle 20. Identification information (vehicle ID) is assigned to each vehicle 20 to uniquely identify the vehicle and is held in a database. The vehicle ID is, for example, a vehicle identification number (a number on a number plate). Identification information (user ID) is also similarly assigned to user information to identify a user and is held in a database. Identification information (booking ID) is also similarly assigned to booking information to identify a booking.

The mobility support server 30 manages facility information containing advertisements and publicities on facilities, such as shops and buildings, located along routes that the vehicles 20 are scheduled to travel or within a predetermined range (for example, within a radius of 10 km) from the routes. Examples of the facilities include a commercial facility, such as a shop located along a travel route, and a building. Examples of the facilities also include a sightseeing facility, such as a park, a theme park, an amusement park, a zoo, an aquarium, a temple, and a shrine. Identification information (facility ID) is also assigned to facility information to uniquely identify the facility and is held in a database.

For example, an application program (hereinafter, also referred to as application) for making a booking to use a vehicle 20 is installed in the user terminal 40. The user terminal 40 in which the application has been installed is assigned with identification information (user ID) that uniquely identifies the terminal, and identification information (user ID) is held as user information in the database of the mobility support server 30. User information is associated with a user ID together with, for example, information for identifying a user (name, address, cellular phone number, mail address, or the like) and attribute information, such as age (generation), occupation, and gender, and is held. The user launches the application installed in the user terminal 40 to enter booking information about a mobility booking of a vehicle 20 into the mobility support server 30 according to his or her own use or purpose. Booking information contains a scheduled boarding point and scheduled boarding date and time to get on the vehicle 20, a scheduled alighting point and scheduled alighting date and time to get off the vehicle 20, and the like. When the vehicle 20 is a vehicle that is owned by a user, a destination, departure point, and scheduled travel route to the destination, set by a car navigation system, or the like, are used instead of a scheduled boarding point, a scheduled boarding date and time, a scheduled alighting point, and a scheduled alighting date and time.

Figure 3:
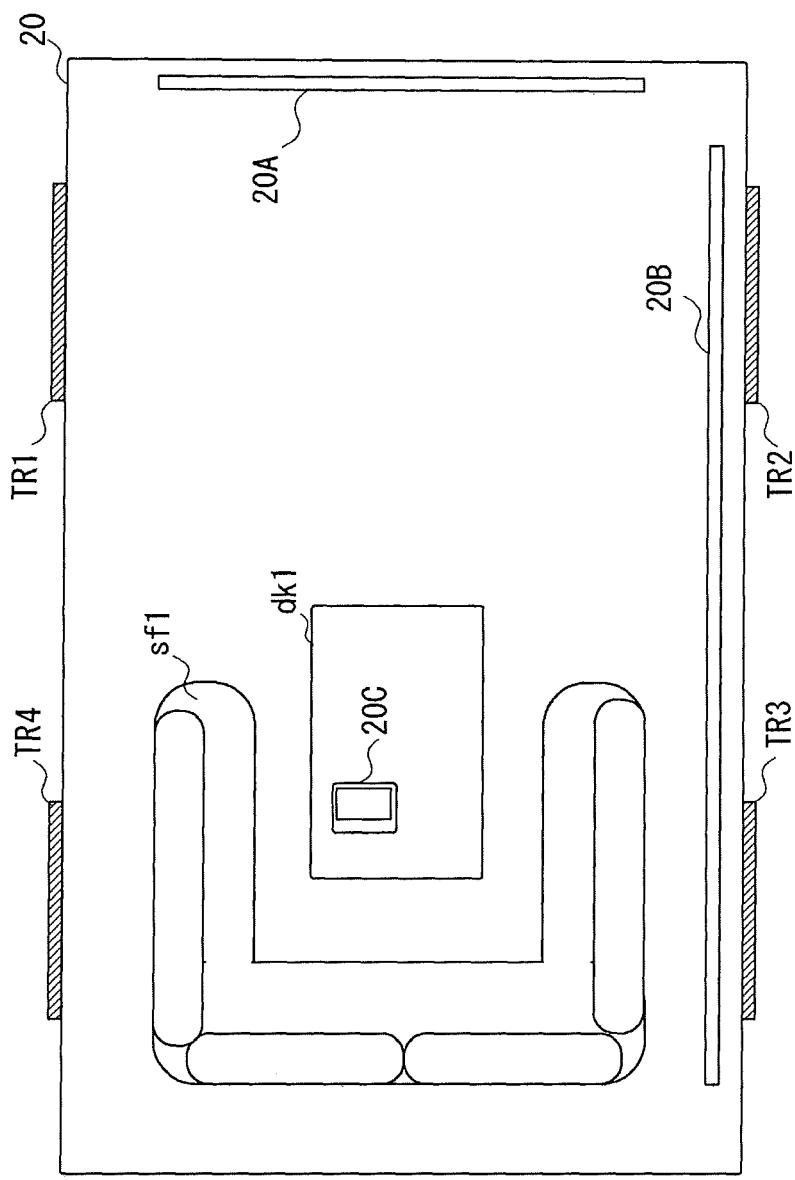
FIG. 3 is a diagram that illustrates equipment and other furnishings provided in the vehicle.

FIG. 3 is a diagram that illustrates equipment and other furnishings provided in the vehicle 20 that provides a mobility service. FIG. 3 illustrates a schematic plan view of the inside of the vehicle (a view of the inside of the vehicle from a ceiling side) in which a sofa sf1, a desk dk1, displays 20A, 20B, and an input terminal 20C are provided in an internal space. FIG. 3 is an example of a mode in which the display 20A is provided forward in the direction of travel of the vehicle in the internal space and the display 20B is provided to the right in the direction of travel of the vehicle in the internal space. A display(s) that is/are provided in the internal space of the vehicle 20 may be provided in part of a region in the internal space as illustrated in FIG. 3 or may be provided so as to cover the entire surface of the internal space of the vehicle 20.

The displays 20A, 20B each are a display device, such as a liquid crystal display (LCD). Alternatively, the displays 20A, 20B each may be an organic electroluminescence (EL) display, a light emitting diode (LED) matrix, or a projector. The input terminal 20C is a terminal device that allows a user to perform input operation on display information that is displayed on each display. Examples of such a terminal device include a tablet terminal, a personal information terminal, and a remote control unit. The input terminal 20C is part of an input unit 28 of the vehicle 20 as will be described later.

Various display contents, such as movies and dramas, booked to watch in advance are displayed as display information on the displays 20A, 20B provided inside the vehicle 20. A user in the vehicle 20 is able to operate the input terminal 20C while being seated on, for example, the sofa sf1, or the like, and move to a destination as the user watches display contents that are displayed on the displays in response to the operation. In the present embodiment, display information contains an image outside the vehicle, captured by a camera, or the like, equipped for the vehicle 20, such as an image of a landscape, or the like, along a scheduled travel route. An image outside the vehicle is, for example, captured at a predetermined frame rate (for example, 30 fps).

The mobility support system 1 according to the present embodiment acquires facility information containing advertisements or publicities on facilities, such as shops and buildings, located along a scheduled travel route based on the positional information of the vehicle 20, the captured image captured at the predetermined frame rate, and the like. Similarly, the mobility support system 1 according to the present embodiment acquires facility information about facilities located within the predetermined range from the travel route. The mobility support system 1 according to the present embodiment processes the images of structures that make up the facilities, such as shops and buildings, based on the acquired facility information and displays the images on the displays 20A, 20B provided in the internal space of the vehicle 20. In the present embodiment, facility information, such as advertisements and publicities, about facilities, such as shops and buildings, located along a travel route is displayed in a display area of each display together with the captured images of structures that make up the facilities. Similarly, facility information about facilities located within the predetermined range from the travel route is displayed in the display area of each display together with the captured image captured while traveling. According to the present embodiment, not only mobility with a vehicle but also facility information, such as advertisements and publicities, about facilities, such as shops and buildings, associated with a travel route can be effectively provided for a passenger of the vehicle.

Figure 4:
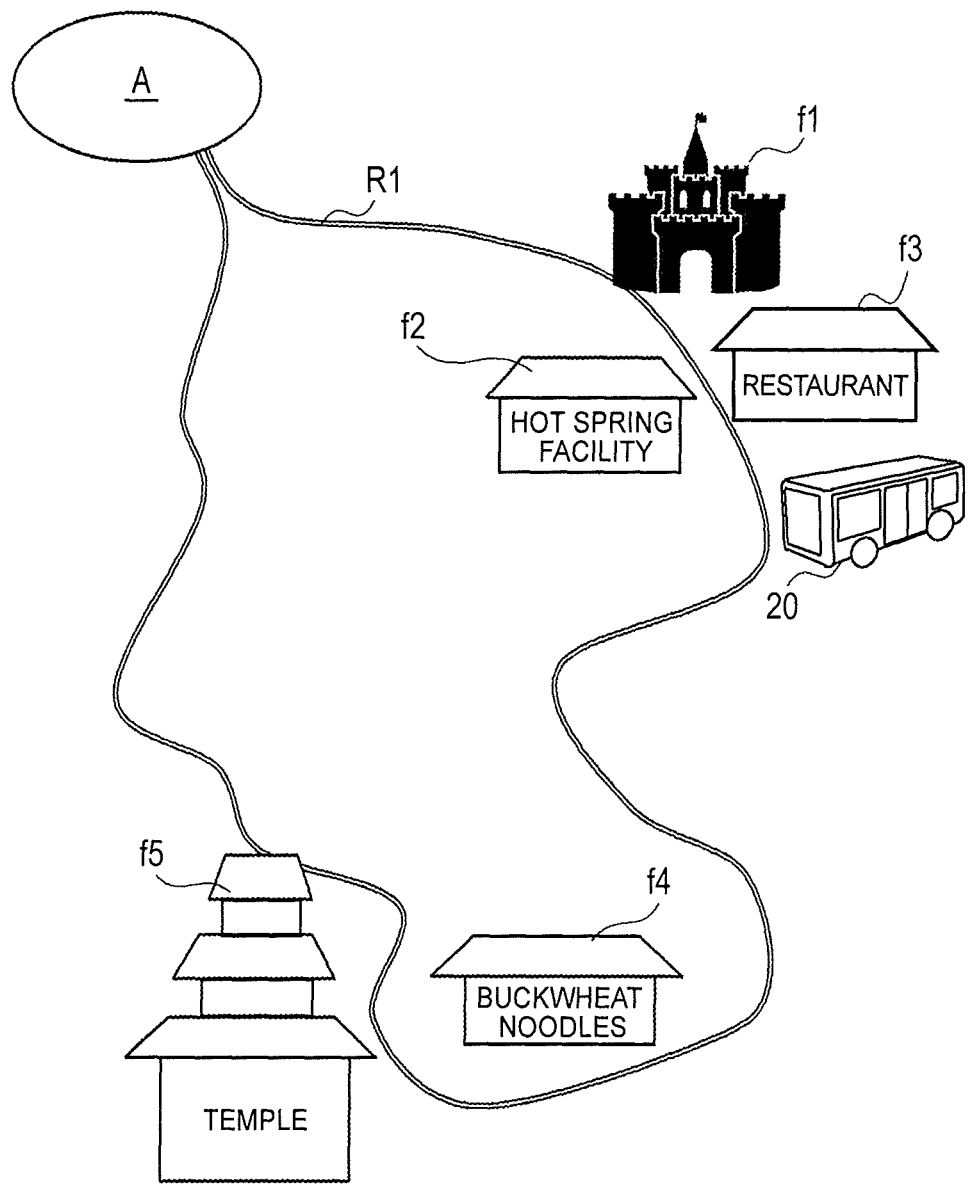
FIG. 4 is a view that illustrates provision of facility information.

FIG. 4 is a view that illustrates provision of facility information according to the present embodiment. FIG. 4 illustrates the vehicle 20 that leaves a point A, travels along a route R1 that is a scheduled travel route, and provides a mobility service for seeing historic sites to a user who rides the host vehicle. The point A is a sightseeing terminal, such as a train station in a region where the user sees the historic sites. Along the route R1, or within the predetermined range from the route R1, facilities f1, f2, f3, f4, f5 are located. For example, the facility f1 is a sightseeing facility, such as a theme park, and the facility f2 is a hot spring facility where people can enjoy one-day hot spring, or the like. The facilities f3, f4 are shop facilities, such as a restaurant and a buckwheat noodle shop, that provide services for food, beverages, or the like, to users. The facility f5 is a sightseeing facility, such as a temple including a historic structure, such as a three-storied pagoda. A user who uses a mobility service of the vehicle 20 is assumed to, for example, sightsee the region including the facility f5 for the purpose of visiting the facility f5.

The vehicle 20 that has left the point A moves along the route R1 and moves to around a region where the facilities f1, f2, f3 are located. The vehicle 20 provides the positional information of the host vehicle and the captured image captured by the camera, or the like, to the mobility support server 30 together with the vehicle ID of the host vehicle. The mobility support server 30 identifies pieces of facility information about the facilities f1, f2, f3 located along the wayside or located within the predetermined range based on the positional information and captured image provided from the vehicle 20. The pieces of facility information about the facilities f1, f2, f3 are, for example, identified from the facility information held in the database. Facility information contains an advertisement for propagating the facility, a publicity for describing the facility, or the like, together with an image(s) (visual information) generated by computer graphics (CG), or the like, of a structure(s) that make(s) up the facility.

The mobility support server 30 acquires the identified facility information and provides the facility information to the vehicle 20 through the network N1. The pieces of facility information about the facilities f1, f2, f3 are received by the vehicle 20. A captured image containing the facilities f1, f2, f3, and the like, that are structures outside the vehicle, captured via the camera, or the like, is displayed on the display 20A, or the like, provided in the vehicle 20 traveling along the route R1.

For example, when a captured image of a structure that is the facility f1 is displayed forward in the direction of travel, the vehicle 20 displays the facility information about the facility f1 in the display area of the display 20A on which the facility is displayed. When a captured image of the facility f2 or facility f3 along the route R1 is displayed on the display 20B provided to the side, the vehicle 20 displays the facility information about the facility f2 or facility f3 in the display area of the display 20B on which the facility is displayed. Facility information containing visual information, such as CG, is superposed on a real landscape captured through the camera, or the like, and is displayed on the same screen on the display 20A or display 20B provided in the internal space of the vehicle 20 that travels along the route R1 in a region in which the facilities f1, f2, f3 are located. A user who rides the vehicle 20 is able to effectively learn an advertisement, a publicity, or the like, on the facility based on a landscape image and facility information, displayed on the same screen of each display.

The vehicle 20 further moves along the route R1 and moves to around a region where the facility f4 and the facility f5 are located. The vehicle 20, as in the case of the above, provides the positional information of the host vehicle and captured image captured by the camera, or the like, to the mobility support server 30 together with the vehicle ID. In the mobility support server 30, pieces of facility information about the facilities f4, f5 located along the way or located within the predetermined range are identified based on the provided positional information and captured image. The identified pieces of facility information about the facilities f4, f5 are provided to the vehicle 20. The facility information containing visual information, such as CG, is superposed on the real landscape and is displayed on the same screen on each display provided in the internal space of the vehicle 20.

Figure 5:
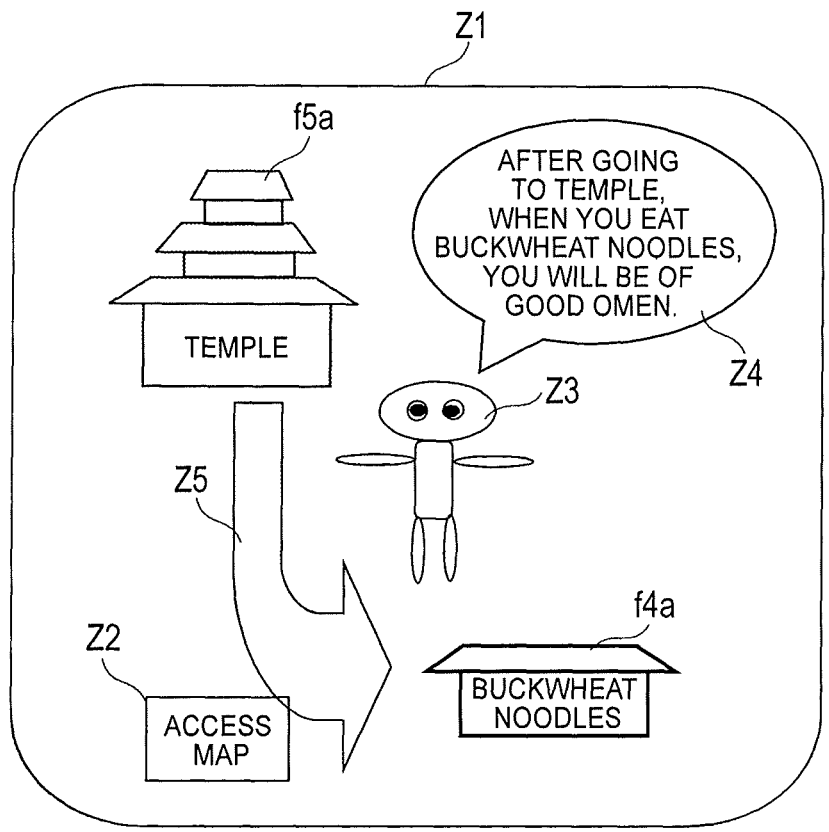
FIG. 5 is a view that illustrates an example of a display mode of facility information.

FIG. 5 is a view that illustrates an example of a display mode of facility information. In FIG. 5, the region surrounded by the solid rectangular frame is an example of a display screen Z1 that is displayed on the display 20A, or the like. On the display screen Z1, a publicity that propagates the facilities f4, f5 is illustrated as facility information.

On the display screen Z1, for example, an image f5a is a captured image of the structure of the real facility f5, captured via the camera, or the like. Similarly, an image f4a is a captured image of the real facility f4. An image Z3 is a character image generated by CG, or the like, to propagate the facilities f4, f5. The real images f4a, f5a captured by the camera, or the like, are displayed on the display 20A, or the like, of the vehicle 20 that has moved to around the region where the facilities f4, f5 are located.

As illustrated in FIG. 5, in the vehicle 20 that has received facility information about the facilities f4, f5, display positions where the images f4a, f5a of the real facilities are displayed on the display 20A, or the like, are adjusted as needed based on facility information through image processing. The vehicle 20 adjusts the display position of the character image Z3, a balloon region Z4 where publicity information is displayed, an access map Z2 for guiding the facility f4, and a placement position of an instruction image Z5, on the display 20A, or the like, as needed based on publicity information contained in facility information.

Adjustment of the display position is performed on, for example, a two-dimensional coordinate system (X,Y) where the vertical direction of each display is a Y direction and the horizontal direction is an X direction. The vehicle 20 adjusts the display position such that the center of each image is contained in the display area, for example, where the coordinates of the top left corner of the display are (0,0) and the coordinates of the bottom right corner are (maxX,maxY). The vehicle 20 displays the character image Z3 contained in the facility information, the balloon region Z4 in which the publicity information is displayed, the access map Z2, and the instruction image Z5 so as to be superposed on the display screen on which the images f4a, f5a are displayed. A user is able to learn an access to the shop facility f4 based on the access map Z2, the instruction image Z5, and the publicity information displayed in the balloon region Z4, displayed on the same screen together with the captured images f4a, f5a of the real facilities f4, f5.

Alternatively, the vehicle 20 may, for example, receive user's input operation via the input terminal 20C and enlarge or reduce the captured images f4a, f5a of the real facilities f4, f5 displayed in the display area. The vehicle 20 is able to provide information adapted to user's preferences by changing the degree to which the captured images f4a, f5a are enlarged or reduced according to the amount of operation of the user.

In addition, in the present embodiment, the mobility support system 1 may acquire event information about a predetermined event that a user who rides the vehicle 20 is scheduled to participate in, perform image processing based on the acquired event information, and display the processed captured image. For example, a display mode in which the image of the facility f5 for sightseeing is processed into an image viewed from the eyes of a visitor and a user who has passed a gate sees a structure or plants provided in a garden, or the like, in simulation is illustrated. Thus, it is possible to effectively propagate or advertise a facility, or the like, for sightseeing to a user who is scheduled to participate in an event or publicize the facility.

In the present embodiment, the mobility support system 1 may be configured to acquire information about the acceleration of the vehicle 20 while moving. The mobility support system 1 may display a captured image to be displayed on the display provided in the internal space of the vehicle 20 such that an acceleration in a direction different from the direction of the acquired acceleration (for example, in an opposite direction, or the like) can be experienced in simulation.

For example, in FIG. 4, in a route from the facility f2 to the facility f4, there is a partial route that gives an acceleration whose direction changes from left to right to a user who rides the vehicle 20. The vehicle 20, for example, acquires information about the acceleration of the host vehicle when moving along the partial route. The vehicle 20 displays a captured image of a landscape, or the like, along the partial route to be displayed on the display provided in the internal space of the vehicle 20 by modifying the captured image so as to be a display mode in a direction opposite from the direction of the acquired acceleration. For example, when an acceleration toward the left from the vehicle body is generated, a captured image to be displayed on the display, or the like, is displayed so as to be inclined toward the right with reference to the center of the image captured by the camera. Similarly, when an acceleration toward the right from the vehicle body is generated, a captured image to be displayed on the display, or the like, is displayed so as to be inclined toward the left with reference to the center of the image captured by the camera. When the character image Z3 is displayed as shown in FIG. 5, the character image Z3 may be processed and displayed so as to sway in a direction opposite from the acceleration direction and flurry. Display contents using the travel status of the vehicle 20 can be provided to a user who rides the vehicle 20. In the present embodiment, a propagation, an advertisement, or a publicity on a region where a mobility service is provided can be effectively performed.

Functional Configuration

Figure 6:
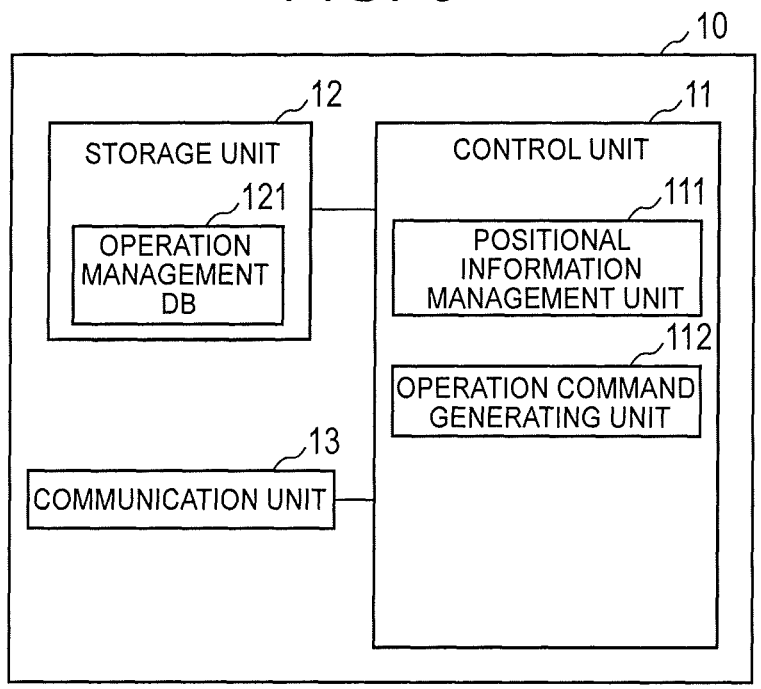
FIG. 6 is a diagram that shows an example of the functional configuration of a center server.

Next, the functional configurations of the center server 10, vehicles 20, and mobility support server 30 of the mobility support system 1 according to the present embodiment will be described with reference to FIG. 6 to FIG. 12. FIG. 6 is a diagram that shows an example of the functional configuration of the center server 10. The center server 10 includes a control unit 11, a storage unit 12, and a communication unit 13 as functional elements. The communication unit 13 is a communication interface with the network N1. The communication unit 13 includes, for example, a LAN interface board and a wireless communication circuit for wireless communication. The center server 10 cooperates with the mobility support server 30, manages autonomous travel of the vehicles 20, and generates operation commands to the vehicles 20.

The center server 10 is, for example, a general-purpose computer including a processor, a main storage device, and an auxiliary storage device. The processor includes a central processing unit (CPU), a digital signal processor (DSP), a graphics processing unit (GPU), and the like. The main storage device includes a flash memory, a random access memory (RAM), a read only memory (ROM), and the like. The auxiliary storage device is a nonvolatile storage device that rewritably stores various programs, including an operating system (OS), and various data in a recording medium. The OS contains a communication interface program to exchange data with an external apparatus, or the like, connected via the communication unit 13. Examples of the auxiliary storage device include a portable recording medium, a flash memory, a hard disk drive (HDD), and a solid state drive (SSD). Examples of the portable recording medium include a universal serial bus (USB) memory and a disc recording medium, such as a compact disc (CD) and a digital versatile disc (DVD).

The processor runs a computer program expanded to be executable in a work area of the main storage device to control the whole center server 10. The processor provides functions that match predetermined purposes (described later) by controlling peripheral devices through running of the computer program. Alternatively, part of the functions may be provided by a hardware circuit, such as an application specific integrated circuit (ASIC), a field-programmable gate array (FPGA), a numerical processor, and an image processor. The center server 10 may be a single computer or may be made up of a plurality of computers that cooperate with one another.

The control unit 11 is an information processing function that is provided by the processor running the computer program. The control unit 11 provides an information processing function of managing autonomous travel of the vehicles 20 and generating operation commands that are sent to the vehicles 20. The control unit 11 includes at least a positional information management unit 111 and an operation command generating unit 112. A series of processes that are executed by the center server 10 can be executed by software and can also be executed by hardware.

The positional information management unit 111 collects and manages positional information (for example, latitude and longitude) from the vehicles 20 that are placed under the control of the center server 10. The positional information management unit 111 receives current positional information sent from the vehicles 20 periodically or in response to a request from the center server 10 and stores the current positional information in an operation management DB 121 constructed in the storage unit 12.

The operation command generating unit 112 cooperates with the mobility support server 30 and generates operation commands on the vehicles 20 that provide mobility services. The operation command generating unit 112 generates, for example, an operation command on operation along a route in a predetermined region where a mobility service is provided by the vehicle 20 or moving between a departure point (scheduled boarding point) and a destination point (scheduled alighting point), designated by a user.

The operation command generating unit 112, for example, references the positional information acquired from the vehicle 20, and map data stored in the auxiliary storage device, or the like, and identifies a moving route (route) from a current position as a departure point to a destination point. The operation command generating unit 112 generates an operation command to travel along the identified moving route and reach the destination point. An operation command may contain identification information (for example, a link number) of a scheduled travel route, identification information (for example, a node number) of an intersection, or the like, an address, and other information. An operation command also contains an instruction like "temporarily stop by" or "load or unload a user", or the like.

The storage unit 12 is configured to include a main storage device and an auxiliary storage device. An operation management database (DB) 121 for managing operation information about operations of the vehicles 20 is constructed in the storage unit 12. The operation management DB 121 is, for example, a relational database that is constructed by a program of a database management system (DBMS), running on the processor to manage data that is stored in the auxiliary storage device, or the like.

FIG. 7 is a table that shows an example of operation management information that is stored in the operation management DB 121. As illustrated in FIG. 7, pieces of operation management information are managed as an operation management table. For information that is entered in the operation management table, addition, change, or deletion of a field is allowed as needed.

In FIG. 7, the operation management table has fields of region ID, vehicle ID, service type, operator ID, hub ID, current position, moving route, and operation status. Identification information (region ID) that indicates a region where a mobility service is provided by a vehicle 20 is stored in the region ID field. A region ID is, for example, regional mesh information (standard regional mesh code, divided regional mesh code, or the like). Alternatively, information that is stored in the region ID field may be information that indicates a city, ward, town, village, or the like, or may be information separated by latitude and longitude that identify a region where a vehicle provides a service.

Identification information (vehicle ID) that uniquely identifies the vehicle 20 that is placed under the control of the center server 10 is stored in the vehicle ID field. A vehicle ID is, for example, a vehicle identification number. Information that identifies the type of service that a vehicle provides is stored in the service type field. For example, information such as "shop" is stored for the vehicle 20 that functions as a shop to sell transaction goods or provides a service, information such as "passenger transport" is stored for the vehicle 20 that provides a mobility service, and information such as "distribution" is stored for the vehicle 20 that provides a distribution service for baggage, or the like.

Identification information (operator ID) that uniquely identifies an operator that provides various services with the use of the vehicle 20 is stored in the operator ID field. An operator ID is, for example, an operator code allocated to an operator. Information (address, latitude/longitude, or the like) that indicates a place to be a hub for the vehicle 20 is stored in the hub ID field. The vehicle 20 leaves from a hub place that is identified by a hub ID, provides a service in a region that is designated with a region ID, and then returns to the hub place. Positional information (latitude, longitude, or the like) that indicates the current position of the vehicle 20 is stored in the current position field. Positional information is updated upon receiving positional information sent from the vehicle 20. Positional information may contain identification information (for example, a link number) of a road where the vehicle 20 is located, identification information (for example, a node number) of an intersection, or the like, an address, and other information. Information that indicates a route along which the vehicle 20 is scheduled to travel is stored in the moving route field. Status information that indicates the operation status of the vehicle 20 is stored in the operation status field. For example, information such as "operating" is stored when the vehicle is providing a mobility service through autonomous travel, and information such as "resting" is stored when the vehicle is not providing the mobility service.

Figure 8:
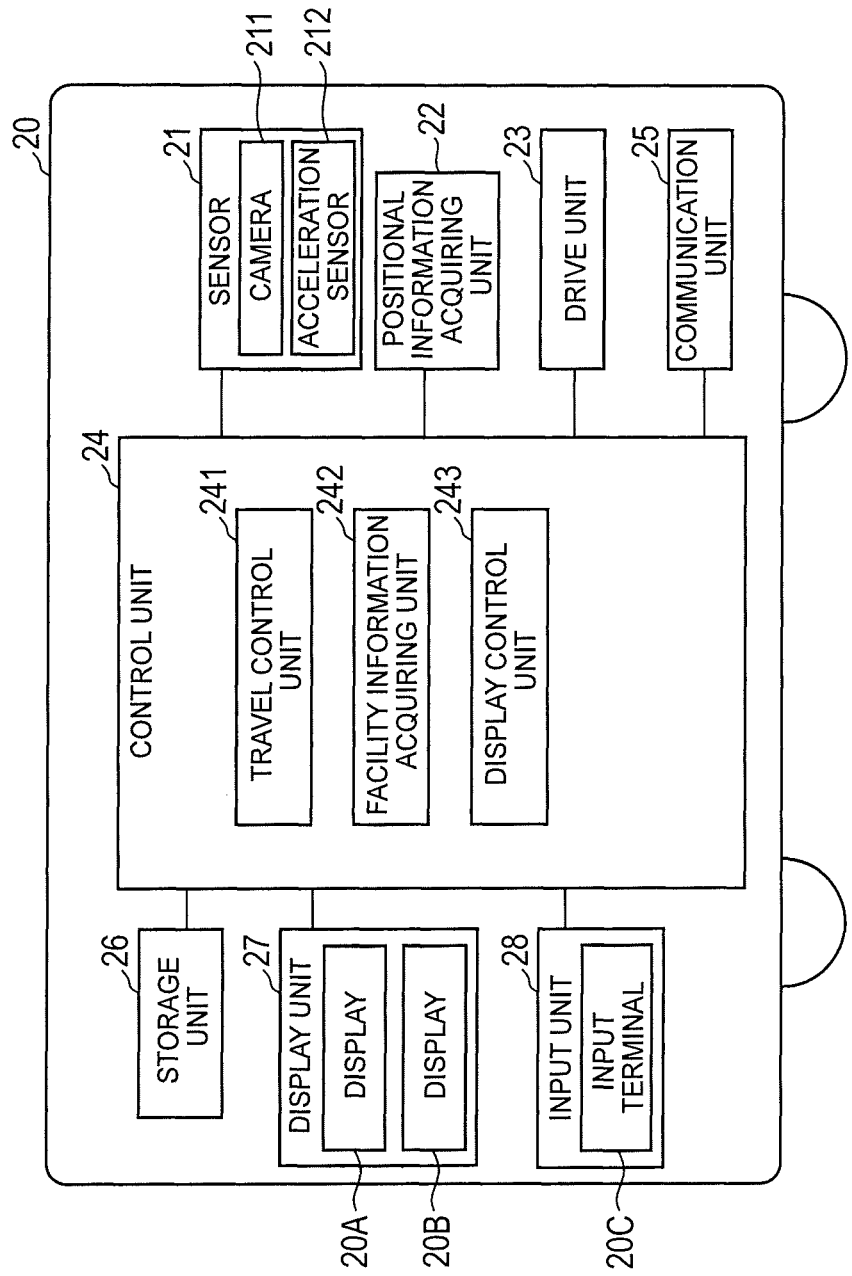
FIG. 8 is a diagram that shows an example of the functional configuration of the vehicle.

Next, the functional configuration of each vehicle 20 will be described. FIG. 8 is a diagram that shows an example of the functional configuration of the vehicle 20. The vehicle 20 includes a sensor 21, a positional information acquiring unit 22, the drive unit 23, a control unit 24, a communication unit 25, a storage unit 26, a display unit 27, and an input unit 28 as functional elements. The vehicle 20 generates a travel route in accordance with an operation command acquired from the center server 10 and autonomously travels on a road along the route with an appropriate method while sensing surroundings of the host vehicle. The communication unit 25 and the storage unit 26 are respectively similar to the communication unit 13 and storage unit 12 of the center server 10, so the description thereof is omitted.

The sensor 21 is a collection of sensors provided in the vehicle 20 and is a device to sense the travel status of the host vehicle and an environment around the host vehicle to acquire information required for autonomous travel. For example, an acceleration sensor 212, a speed sensor, a geomagnetic sensor, a gyro sensor, or the like, is illustrated as the sensor that senses the travel status of the vehicle 20. For example, a camera (a stereo camera, a visible light camera, an infrared camera, or the like) 211, a laser scanner, light detection and ranging or laser imaging detection and ranging (LIDAR), radar, or the like, is illustrated as the sensor for sensing surroundings of the vehicle 20. Information acquired by the sensor 21 is, for example, provided to the control unit 24 and used to, for example, recognize an obstacle or travel lane present around the vehicle 20.

The positional information acquiring unit 22 is a device that acquires the current position of the vehicle 20 and is configured to include, for example, a receiver of a global positioning system (GPS), or the like. Information (for example, latitude, longitude, or the like) acquired by the positional information acquiring unit 22 is provided to the control unit 24 and used to, for example, calculate a route along which the vehicle 20 travels or execute guiding process to reach a destination. Information acquired by the positional information acquiring unit 22 is sent to the center server 10 and the mobility support server 30, connected to the network N1, via the communication unit 25 periodically or in response to a request from any one of the servers.

The drive unit 23 is a device that propels the vehicle 20 based on a control command generated by the control unit 24. The drive unit 23 is configured to include, for example, drive motors and inverters for driving the wheels, a brake, a steering motor, a steering mechanism, and the like. The drive unit 23 causes the vehicle 20 to autonomously travel by appropriately increasing or decreasing controlled amounts of the motors, inverters, brake, steering, and the like, in accordance with the control command.

The control unit 24 is a computer that controls the host vehicle based on information acquired from the sensor 21 and the positional information acquiring unit 22. The control unit 24 is, for example, a microcomputer including a processor, such as a CPU. The control unit 24 provides various processing functions that match a predetermined purpose by the processor reading and running various programs, various data, and the like, stored in the storage unit 26. The control unit 24 provides at least functional modules of a travel control unit 241, facility information acquiring unit 242, and display control unit 243. The functional modules that are provided by the control unit 24 may be implemented by hardware or may be implemented by a plurality of computers that cooperate with one another.

The travel control unit 241 acquires an operation command from the center server 10 and generates an operation plan of the host vehicle. The operation command contains information about a departure place, a destination, a route passing through the destination, and the like, on which an instruction is provided to the vehicle 20. The travel control unit 241 generates the above-described operation plan based on the destination and the route to the destination, provided by the center server 10, and the position of the host vehicle, obtained by the positional information acquiring unit 22.

The travel control unit 241 detects a surrounding situation required for autonomous travel based on data acquired by the sensor 21. Examples of objects to be detected include the number and positions of lanes, the number and positions of vehicles present around the host vehicle, the number and positions of obstacles (for example, pedestrians, bicycles, structure, buildings, and the like) present around the host vehicle, the structure of a road, and a road sign; however, the objects to be detected are not limited thereto. As long as an object is required for autonomous travel, any object to be detected is applicable. For example, when the camera 211, or the like, is provided, a surrounding object is detected by applying image processing on image data captured by the camera 211, or the like. The travel control unit 241 is also able to keep track of a detected object (continue detecting a detected object) to find a relative velocity relative to the object.

In addition, the travel control unit 241 generates a control command for controlling autonomous travel based on the generated operation plan, the data on the detected surrounding situation, and the positional information of the host vehicle. For example, the travel control unit 241 generates a control command such that the host vehicle travels along a predetermined route and no obstacle enters a predetermined safety region about the host vehicle. The generated control command is output to the drive unit 23.

The travel control unit 241 sends the vehicle information of the host vehicle, stored in the storage unit 26 in advance, periodically or in response to a request from the mobility support server 30, to the mobility support server 30 connected to the network N1 through the communication unit 25. The travel control unit 241 adds the vehicle ID that uniquely identifies the host vehicle to the vehicle information and sends the vehicle information to the mobility support server 30.

The facility information acquiring unit 242 sends a captured image captured at a predetermined frame rate (for example, 30 fps) via the camera 211 periodically or in response to a request from the mobility support server 30, to the mobility support server 30 connected to the network N1 through the communication unit 25. The camera 211 may be a single camera or may be made up of, for example, a plurality of cameras provided so as to be able to capture the front, rear, right, and left with respect to the direction of travel of the vehicle 20. A captured image captured at the predetermined frame rate via the camera 211 is sent to the mobility support server 30 together with the vehicle ID of the host vehicle.

The facility information acquiring unit 242 acquires facility information or event information, provided from the mobility support server 30, and stores the facility information or event information in a predetermined area of the storage unit 26 together with time information. Facility information containing an advertisement or publicity on a facility, such as a shop or a building, located along a route along which the host vehicle is scheduled to travel or located within a predetermined range (for example, within a radius of 10 km, or the like) and event information about an event that a user is scheduled to participate in are stored in the storage unit 26.

The display control unit 243 controls information to be displayed in the display area of each of the displays 20A, 20B that make up the display unit 27 and displays the information. The display control unit 243, for example, displays the captured image captured via the camera 211 and the acquired facility information and event information in the display area of each display in a superimposed manner.

The display control unit 243 receives user's input operation on a CG image, a captured image of a real facility, or the like, displayed on each display. User's input operation is, for example, performed through the input terminal 20C that is a component of the input unit 28. The display control unit 243 changes the degree to which an image to be operated is enlarged or reduced according to the received amount of operation of the user.

For example, when the input terminal 20C is a tablet terminal having a touch panel, the display control unit 243 displays information to be displayed in the display area of each display, on the display device of the input terminal 20C. A user, for example, taps on a captured image, facility information, or event information, displayed on the display screen of the input terminal 20C to designate an image to be operated. The input terminal 20C detects the coordinates in the display area, at which tap operation has been performed, and provides the detected coordinates to the display control unit 243. Based on the provided coordinates, the display control unit 243 identifies the information displayed in the display area including the coordinates.

The input terminal 20C receives input operation, such as touch operation (pinch out, pinch in) concerning enlargement or reduction of display information on which tap operation, or the like, has been performed and provides the operation information to the display control unit 243. The display control unit 243 changes the degree to which the display information (captured image, facility information, or event information), or the like, identified through tap operation, or the like, is enlarged or reduced according to the amount of touch operation. On each of the displays provided in the internal space of the vehicle 20, the image of the display information selected by a user who operates the input terminal 20C changes according to the amount of touch operation for enlargement or reduction.

In addition, the display control unit 243 acquires information about the acceleration of the host vehicle while traveling from the acceleration sensor 212. The display control unit 243, for example, displays a captured image to be displayed on the display unit 27 by changing a display mode such that an acceleration in a direction different (for example, opposite direction, or the like) from the direction of the acquired acceleration can be experienced in simulation.

For example, when an acceleration toward the left has been acquired, the display control unit 243 displays a captured image to be displayed on the display, or the like, so as to be inclined toward the right with reference to the center of the image captured by the camera. Similarly, when an acceleration toward the right has been acquired, the display control unit 243 displays a captured image to be displayed on the display, or the like, so as to be inclined toward the left with reference to the center of the image captured by the camera. When a character image generated by CG, or the like, is displayed, the character image can be processed and displayed so as to sway in a direction opposite from the acceleration direction and flurry.

The display unit 27 includes a display, such as an LCD, placed on the entire surface or part of the surface of the internal space of the vehicle 20. In FIG. 8, the display 20A placed forward in the direction of travel of the vehicle and the display 20B placed to the right in the direction of travel of the vehicle are illustrated as elements. The input unit 28 includes a terminal device (input terminal 20C) that allows input operation to the display unit 27 provided in the internal space of the vehicle 20. A tablet terminal, a personal information terminal, a remote control unit, or the like, is illustrated as the input unit 28.

Figure 9:
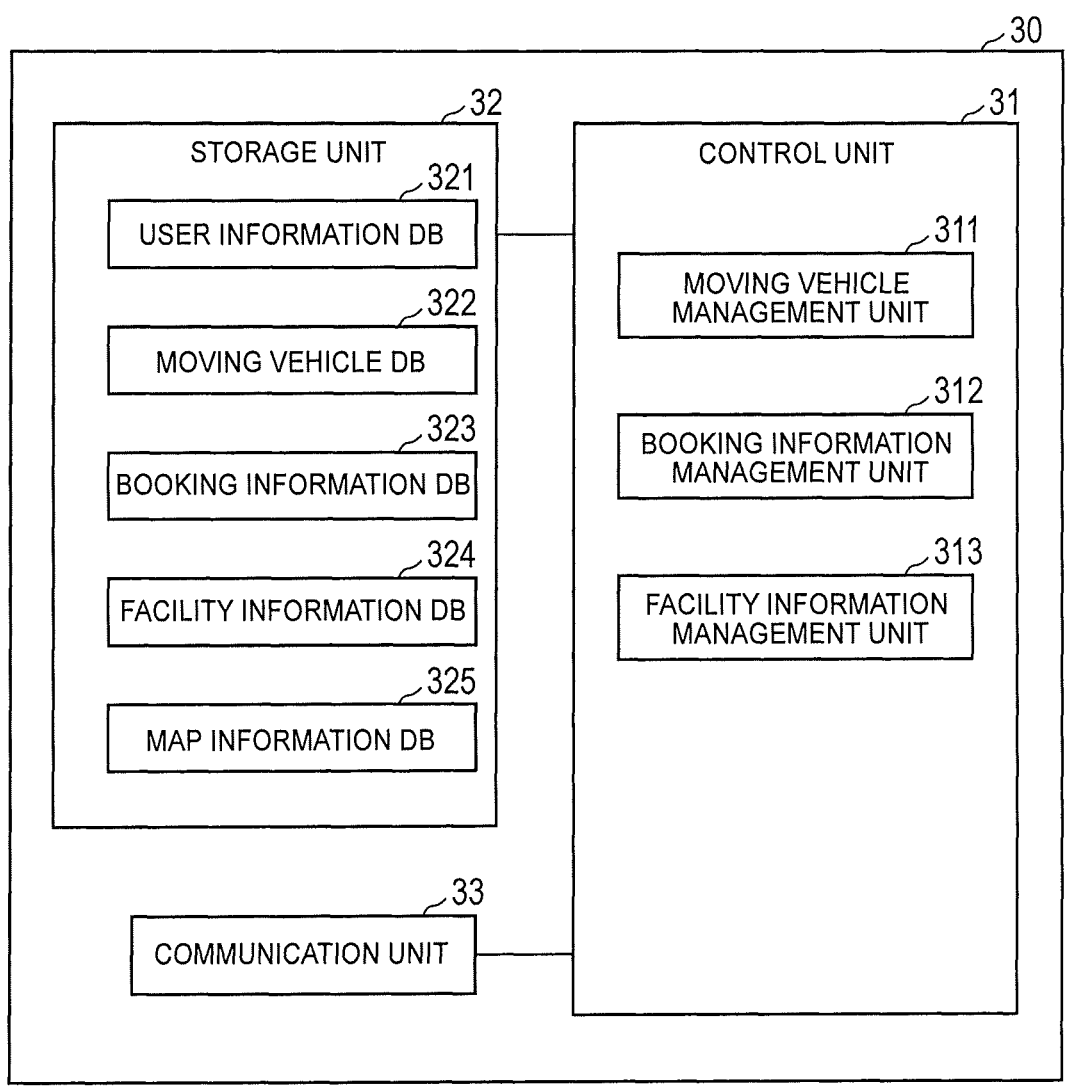
FIG. 9 is a diagram that shows an example of the functional configuration of a mobility support server.

Next, the functional configuration of the mobility support server 30 will be described. FIG. 9 is a diagram that shows an example of the functional configuration of the mobility support server 30. The mobility support server 30 is configured to include a control unit 31, a storage unit 32, and a communication unit 33 as functional elements. The communication unit 33 is similar to the communication unit 13 of the center server 10, so the description thereof is omitted.

The mobility support server 30, as well as the center server 10, is a general-purpose computer including a processor, a main storage device, and an auxiliary storage device. The above-described elements of the mobility support server 30 are similar to those of the center server 10, so the description thereof is omitted. The mobility support server 30 may also be made up of a single computer or may be a system made up of a group of a plurality of computers called cloud. The mobility support server 30, for example, provides functions that match a predetermined purpose by reading an OS, various programs, various tables, and the like, stored in the auxiliary storage device, onto a work area of the main storage device and running the programs to control the following components, and the like.

The main storage device and auxiliary storage device of the mobility support server 30 make up the storage unit 32. A user information DB 321, a moving vehicle DB 322, a booking information DB 323, a facility information DB 324, and a map information DB 325 are constructed in the storage unit 32. These DBs are, for example, relational databases that are constructed by a program of a database management system (DBMS), running on the processor of the mobility support server 30 to manage data that is stored in the auxiliary storage device, or the like.

The control unit 31 is an information processing function that is provided by a computer program running on the processor of the mobility support server 30. The control unit 31 includes at least components of a moving vehicle management unit 311, a booking information management unit 312, and a facility information management unit 313. The information processing function for management of the vehicles 20, each including a display on the entire surface or part of the surface of the internal space, services that the vehicles 20 provide, and the like, is provided by the control unit 31. A series of processes that are executed by the mobility support server 30 can be executed by software and can also be executed by hardware.

The moving vehicle management unit 311 manages vehicle information of each vehicle 20 that provides a mobility service. The moving vehicle management unit 311, for example, extracts the vehicle ID of each vehicle 20 that provides a mobility service for each region ID from the cooperating center server 10. The moving vehicle management unit 311 makes a request of the vehicle 20 associated with each extracted vehicle ID to provide vehicle information. The vehicle 20 connected to the network N1 acquires vehicle information held in the storage unit 26 of the host vehicle and sends the vehicle information in response to a request from the mobility support server 30. The moving vehicle management unit 311 acquires the vehicle information sent from the vehicle 20 in response and stores the vehicle information in the moving vehicle DB 322 in association with the vehicle ID. Each vehicle 20 is also able to periodically provide vehicle information of the host vehicle to the mobility support server 30.

FIG. 10 is a table that shows an example of vehicle information that is stored in the moving vehicle DB 322. As illustrated in FIG. 10, pieces of vehicle information acquired from the vehicles 20 are managed as a vehicle information table. The vehicle information table illustrated in FIG. 10 is, for example, managed for each region ID of a region where a mobility service can be provided by the vehicles 20. For information that is entered in the vehicle information table, addition, change, or deletion of a field is allowed as needed.

In FIG. 10, the vehicle information table includes fields of vehicle ID, operator ID, booking ID, moving information, vehicle size, number of available persons, and hours of operation. Pieces of information that are respectively stored in the fields of the vehicle ID and operator ID are similar to those of FIG. 7, so the description thereof is omitted.

Identification information (booking ID) that uniquely identifies a booking for a mobility service with the vehicle 20 is stored in the booking ID field. Information about a mobility service that the vehicle 20 provides is stored in the moving information field. In FIG. 10, sub-fields of boarding point, destination point, passage point, and scheduled route are illustrated for storing route information about booked moving. Information (for example, latitude, longitude, or the like) that indicates a boarding place of a user who uses the vehicle 20 is stored in the boarding point field. Information that indicates a destination to which a user moves is stored in the destination point field. Information that indicates a passage place before reaching a destination is stored in the passage point field. Information that indicates a moving route including a passage point of the vehicle 20 is stored in the scheduled route field. Information that indicates the dimensions (width (W), height (H), depth (D)) of the moving vehicle is stored in the vehicle size field. Information that indicates the number of available persons of the moving vehicle is stored in the number of available persons field. Information that indicates operation start time and operation end time of a mobility support service that is provided with the moving vehicle is stored in the hours of operation field.

Referring back to FIG. 9, the booking information management unit 312 manages user information received at the time of installation of the application. User information is managed in the user information DB 321. The booking information management unit 312 assigns identification information (user ID) that uniquely identifies a user, at the time when the application is installed onto the user terminal 40. The booking information management unit 312 enters the received user information into the user information DB 321 in association with the user ID. User information contains information including the address, name, phone number, and mail address of a user, and the IP address of the user terminal 40, and attribute information indicating the attributes of the user including age, gender, occupation, family, and hobby.

The booking information management unit 312 manages booking information concerned with the vehicle 20 for which a booking has been determined. Booking information concerned with the vehicle 20 is managed in the booking information DB 323. The booking information management unit 312, for example, receives booking information about a booking of the vehicle 20 that is able to provide a mobility service for the purpose or use of a user through execution of the application provided in the user terminal 40. The booking information management unit 312 enters determined booking information in the booking information DB 323 in association with the vehicle ID of the intended vehicle 20.

FIG. 11 is a table that shows an example of booking information that is stored in the booking information DB 323. As illustrated in FIG. 11, pieces of booking information received from users are managed as a booking information table for each vehicle ID. For information that is entered in the booking information table, addition, change, or deletion of a field is allowed as needed.

In FIG. 11, the booking information table has fields of booking ID, user ID, scheduled boarding point, scheduled boarding date and time, scheduled alighting point, scheduled alighting date and time, purpose, scheduled event, number of persons booked, and status of use. Identification information (booking ID) that uniquely identifies a booking for a mobility service with the vehicle 20 is stored in the booking ID field. Identification information (user ID) that uniquely identifies a user from which a booking for the vehicle 20 has been received is stored in the user ID field. Information that indicates a boarding point at which a user gets on the vehicle 20 is stored in the scheduled boarding point field. Information that indicates a date and time at which a user is scheduled to get on the vehicle 20 is stored in the scheduled boarding date and time field. Information that indicates an alighting point of a user is stored in the scheduled alighting point field. Information that indicates a date and time at which a user is scheduled to get off the vehicle 20 is stored in the scheduled alighting date and time field. Information that indicates a moving purpose (for example, "sightseeing", "shopping", "walk and eat", "family duty", or the like) that a user intends is stored in the purpose field. In FIG. 11, "sightseeing (seeing historic sites)" is illustrated as a moving purpose.

Information about an event that a user is scheduled to participate in is stored in the scheduled event field. Information about an event contains the facility name of a facility that provides the event. In FIG. 11, information "seeing three-storied pagoda (facility name)" is illustrated as a scheduled event. Information that indicates the number of users (the number of passengers) on a booking for moving, designated with the booking ID, is stored in the number of persons booked field. Status information that indicates the status of use on a mobility service designated with a booking ID is stored in the status of use field. For example, when a booked mobility service is being provided, information "in action" is stored. When the mobility service is not yet provided, information "not yet" is stored. When provision of the mobility service has been finished, information "finished" is stored.

Referring back to FIG. 9, the facility information management unit 313 manages facility information about facilities, such as shops and buildings, in a region where a mobility service is provided. Facility information contains advertisements, publicities, or the like, of the facilities. The facility information management unit 313, for example, receives facility information provided from shops, sightseeing facilities, and the like, in a region that is designated with the region ID. The facility information management unit 313, for example, assigns identification information (facility ID) that uniquely identifies the facility and enters received facility information into the facility information DB 324.

FIG. 12 is a table that shows an example of facility information that is stored in the facility information DB 324. As illustrated in FIG. 12, pieces of facility information received from facilities are managed as a facility information table for each region ID. For information that is entered in the facility information table, addition, change, or deletion of a field is allowed as needed.

In FIG. 12, the facility information table has fields of facility ID, genre, facility address, advertisement ID, details, advertisement data, display duration, bonus information, facility name, and uniform resource locator (URL). Identification information (facility ID) that uniquely identifies a facility, such as a shop and a building, is stored in the facility ID field. A category to which a facility that is propagated with an advertisement, a publicity, or the like, is stored in the genre field. Information that indicates the address of the facility (address or positional information (latitude, longitude, or the like)) is stored in the facility address field. Identification information (advertisement ID) that uniquely identifies facility information, such as an advertisement and a publicity that propagates a facility designated with a facility ID is stored in the advertisement ID field. Information that indicates the details of composition of an advertisement designated with an advertisement ID is stored in the details field. In FIG. 12, a facility of the facility ID "S2011" belongs to the genre "sightseeing (historic sites)" and has entries of pieces of facility information designated with a plurality of advertisement IDs "T001a", "T001b", "T001c", and "T001d". The advertisement ID "T001a" is, for example, information that guides a history of a facility and a historic site including the facility. The advertisement IDs "T001b" and "T001c" are, for example, facility information with which the inside of a building, garden, or the like, of a facility is strolled with user's eyes. The advertisement ID "T001d" is facility information with which a scene of an event to be held for a limited time is experienced with user's eyes in simulation.

Information that indicates content data of facility information designated with an advertisement ID is stored in the advertisement data field. Information that indicates a duration during which facility information designated with an advertisement ID is provided is stored in the display duration field. Bonus information that the facility, or the like, provides to a user is stored in the bonus information field. In FIG. 12, "bookmark" that is provided without charge to participants of an event that is held for a limited time is stored. Information that indicates the name of the facility is stored in the facility name field. Information that is stored in the facility name field is, for example, associated with point of interest (POI) information on map data. Information that indicates the address of a webpage set up to introduce a facility, or the like, to a large number of anonymous browsers is stored in the URL field. In each field, when there is no information to be stored, information that indicates no information (for example, "---", blank, or the like) is stored.

Referring back to FIG. 9, map data containing planimetric feature positions and map information containing POI information, such as characters and pictures, that shows the characteristics of each point on the map data are stored in the map information DB 325. The map information DB 325 may be provided from another system connected to the network N1, for example, Geographic Information System (GIS).

Flow of Process

Figure 13:
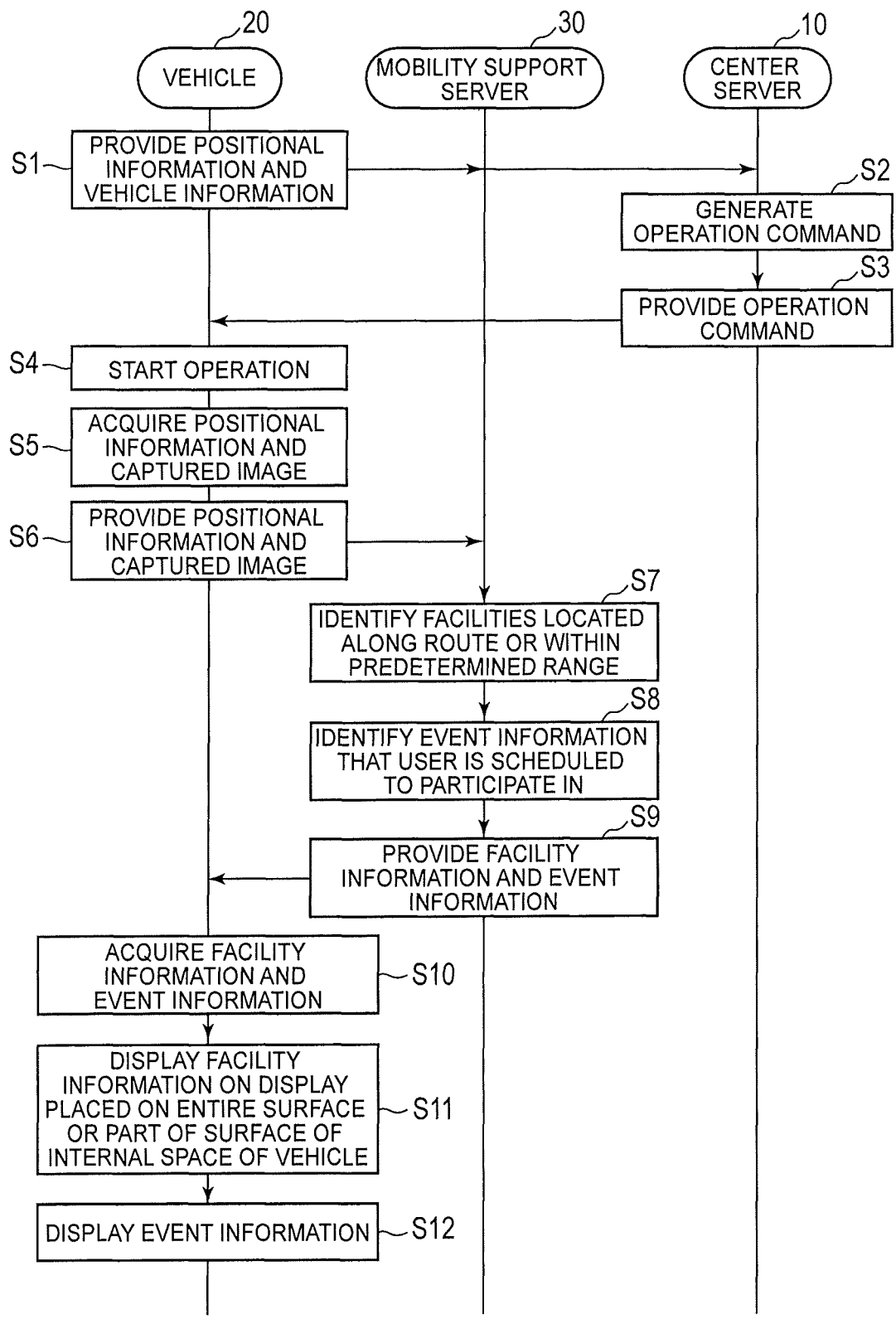
FIG. 13 is a sequence diagram that shows an example of a procedure that the center server, the vehicle, and the mobility support server execute.

The process of the mobility support system 1 according to the present embodiment will be described with reference to FIG. 13. FIG. 13 is a sequence diagram that shows an example of a procedure that the center server 10, the vehicle 20, and the mobility support server 30 execute.

In FIG. 13, the vehicle 20 that provides a mobility service acquires the positional information of the host vehicle via the positional information acquiring unit 22. The vehicle 20 acquires vehicle information stored in the storage unit 26 and provides the vehicle information to the center server 10 and the mobility support server 30 together with the positional information of the host vehicle (S1). The positional information and vehicle information of the vehicle 20 are provided together with the vehicle ID of the vehicle 20.

As the center server 10 receives the positional information and vehicle information provided from the vehicle 20, the center server 10 stores the positional information and the vehicle information in the operation management DB 121 in association with the vehicle ID of the vehicle 20. As the mobility support server 30 receives the vehicle information provided from the vehicle 20, the mobility support server 30 stores the vehicle information in the moving vehicle DB 322 in association with the vehicle ID. Then, the center server 10 generates an operation command based on the positional information and vehicle information provided from the vehicle 20 (S2). The operation command generated by the center server 10 is provided to the vehicle 20 (S3). An operation command contains, for example, a command "temporary stop by at scheduled boarding point", a command "load user", a command "temporary park at passing point", and a command "unload user".

The vehicle 20 that has received the operation command generates an operation plan and starts an autonomous travel operation for providing a mobility service (S4). The vehicle 20, in accordance with the operation command, for example, starts moving while the current position is set as a departure point and the scheduled boarding point of the user is set as a destination point. After the start of moving, the vehicle 20 reaches the scheduled boarding point of the user and loads the user in accordance with the operation command. After the user gets on, for example, the vehicle 20 starts moving for seeing historic sites, which the user is scheduled to do, in accordance with a scheduled route (route R1) as illustrated in FIG. 4.

The vehicle 20 traveling along the scheduled travel route (route R1) acquires the positional information of the host vehicle via the positional information acquiring unit 22. The vehicle 20 acquires a captured image via the camera 211 of the sensor 21 (S5). A captured image containing facilities, such as shops and buildings, located along the route R1 is captured at a predetermined frame rate. The vehicle 20 provides the acquired positional information and captured image to the mobility support server 30 in association with the vehicle ID of the host vehicle (S6).

In the process of S7, the mobility support server 30 consults the map information DB 345, identifies facilities, such as shops and buildings, along the route, and acquires pieces of POI information, or the like. The mobility support server 30 searches the facility information DB 344 with facility names contained in the pieces of POI information of the facilities as key information, and acquires pieces of facility information of the facilities entered in the facility information table. Similarly, the mobility support server 30 identifies sightseeing facilities, such as commercial facilities, parks, theme parks, amusement parks, zoos, aquariums, temples, and shrines, located within a predetermined range from the traveling route, and acquires pieces of POI information of the sightseeing facilities. In addition, the mobility support server 30 searches the facility information DB 344 with the facility names contained in the pieces of POI information of the facilities as key information, and acquires pieces of facility information of the facilities entered in the facility information table.

In the process of S8, the mobility support server 30 searches the moving vehicle DB 322 with vehicle IDs as key information, and acquires information stored in the booking ID field. The mobility support server 30 searches the booking information DB 323 with information stored in the booking ID field as key information, and identifies event information that a user is scheduled to participate in and that is stored in the scheduled event field of the booking information table. For example, in FIG. 11, event information "seeing three-storied pagoda (facility name)" is acquired.

In the process of S9, the mobility support server 30 provides the POI information, facility information, and event information, acquired in the processes of S7 and S8, to the vehicle 20. The mobility support server 30 may provide the facility information and event information entered in the facility information DB 324 to the vehicle 20 in priority to the POI information acquired from map information.

The vehicle 20 acquires the facility information and event information provided from the mobility support server 30 (S10). The facility information about the facilities, such as shops and buildings, located along the scheduled travel route, and the sightseeing facilities, such as commercial facilities, parks, theme parks, amusement parks, zoos, aquariums, temples, and shrines, located within the predetermined range from the traveling route are acquired. Event information (for example, information stored as "event" in the composition details field of the facility information table) about the event that a user is scheduled to participate in is acquired. The vehicle 20 temporarily stores the acquired facility information and event information in a predetermined area of the main storage device.

In the process of S11, the vehicle 20 displays the acquired facility information on the display placed on the entire surface or part of the surface of the internal space of the host vehicle. For example, the facility information, that is, advertisements or publicities on facilities, such as shops and buildings, located along the travel route, is displayed in the display area of the display together with captured images of structures that make up the facilities. In addition, the facility information about facilities located within the predetermined range from the travel route is displayed in the display area of the display together with a captured image captured while traveling.

In the process of S12, the vehicle 20 displays the event information on the display inside the vehicle 20. For example, for a user who is scheduled to participate in an event to see a three-storied pagoda, an image processed so as to move inside the pagoda, captured with the eyes of a visitor, is displayed in the display area of the display together with the captured image of the structure.

Through the above processes, in the mobility support system 1 according to the present embodiment, the vehicle 20 is able to acquire facility information about facilities, such as shops and buildings, located along a scheduled travel route or facilities located within a predetermined range from the traveling route. The facility information contains advertisements or publicities on the facilities. The vehicle 20 is able to process images of the facilities captured via the camera, or the like, based on the facility information and display the facility information on the display provided inside the vehicle 20. According to the present embodiment, a user who uses a mobility service that is provided by the vehicle 20 can be effectively provided with an advertisement, a publicity, or the like, on a facility via an image of the facility, displayed on the same screen, or an image processed based on facility information.

Furthermore, in the mobility support system 1 according to the present embodiment, the vehicle 20 is able to acquire event information about a predetermined event that a user in the vehicle 20 is scheduled to participate in. The vehicle 20 is able to perform image processing based on the acquired event information and display the processed captured image. For example, a display mode in which an image of a facility for sightseeing is processed into an image viewed from the eyes of a visitor and a user who has passed a gate sees a structure or plants provided in a garden, or the like, in simulation is possible. According to the present embodiment, for a user who is scheduled to participate in an event, it is possible to effectively propagate, advertise, or publicize a facility, or the like, for sightseeing.

First Modification

The vehicle 20 is able to receive user's input operation onto an image displayed on the display and change the degree to which the image is enlarged or reduced according to the received amount of operation.

Figure 14:
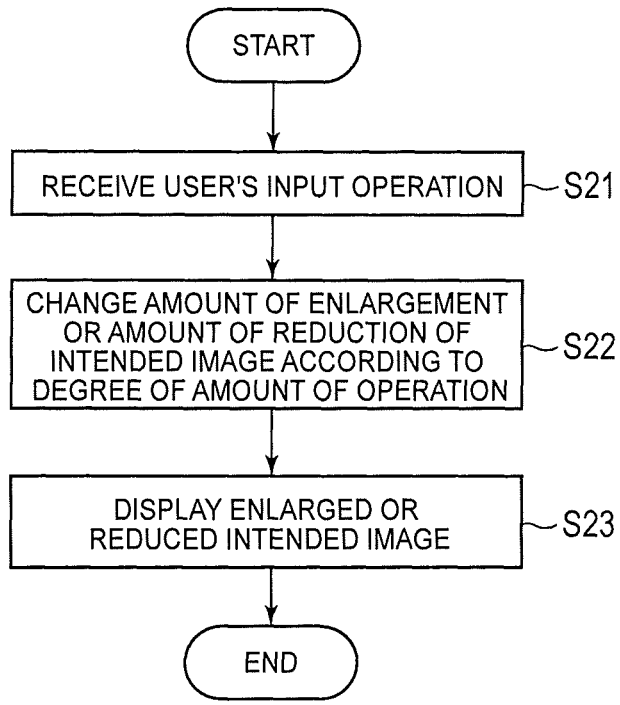
FIG. 14 is a flowchart that shows an example of a process that the vehicle executes according to a first modification.

FIG. 14 is a flowchart that shows an example of a process of the vehicle 20 according to a first modification. In FIG. 14, the time when user's input operation has been received via the input unit 28 is illustrated as the start of the process. The vehicle 20, for example, receives user's input operation onto a CG image or a captured image of a real facility, or the like, displayed on the display, via the input terminal 20C that is a component of the input unit 28 (S21). The vehicle 20, for example, receives instruction operation, such as tap operation, on an image displayed on a display device of the input terminal 20C via a touch panel. Information displayed on the display is also displayed on the display device of the input terminal 20C. The vehicle 20, for example, acquires the coordinates of a display area at which tap operation has been performed and detected via the input terminal 20C, and identifies the information displayed in the display area of the display.

The vehicle 20 receives input operation, such as touch operation (pinch out, pinch in) concerning enlargement or reduction of display information through the input terminal 20C and changes the degree of the amount of enlargement or reduction of the intended image according to the amount of touch operation (S22). The vehicle 20 displays the intended image whose degree of the amount of enlargement or reduction is changed according to the amount of operation of the user, on the display provided inside the vehicle 20 (S23). After the process of S23, the process of FIG. 14 is ended.

Through the above processes, in the mobility support system 1 according to the first modification, the vehicle 20 is able to receive input operation onto an image displayed on the display through the input unit 28. The vehicle 20 is able to change the degree to which the intended image is enlarged or reduced according to the amount of operation. The intended image whose degree of the amount of enlargement or reduction is changed is displayed on the display provided inside the vehicle 20. According to the mode of the first modification, information adapted to user's preferences can be provided.

Second Modification

Figure 15:
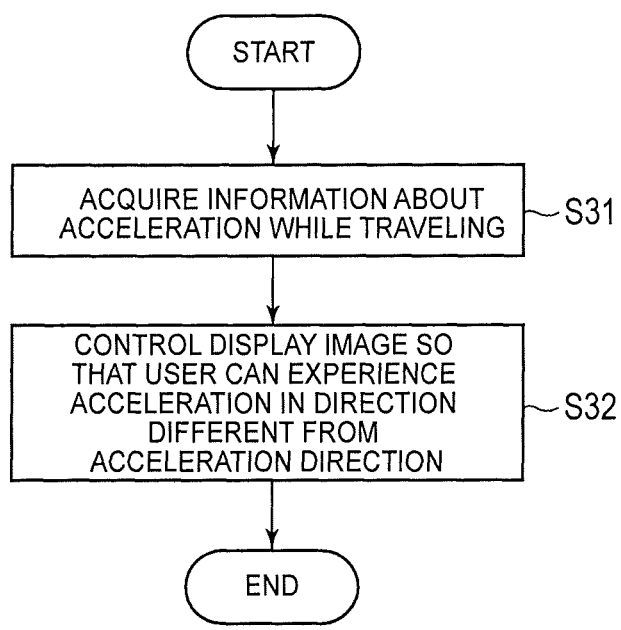
FIG. 15 is a flowchart that shows an example of a process that the vehicle executes according to a second modification.

The vehicle 20 is able to acquire information about an acceleration of the host vehicle while traveling and display a captured image that is displayed on a display provided in an internal space of the vehicle 20 such that an acceleration in a direction different from the direction of the acquired acceleration (for example, an opposite direction, or the like) can be experienced in simulation. FIG. 15 is a flowchart that shows an example of a process of the vehicle 20 according to a second modification. The process of FIG. 15 is periodically executed while traveling.

In FIG. 15. the vehicle 20 acquires information about an acceleration while the host vehicle is traveling (S31). Information about an acceleration contains, for example, an acceleration value detected with the acceleration sensor 212 or the direction of an acceleration, detected with the gyro sensor or another sensor. The vehicle 20 temporarily stores information about the acquired acceleration in a predetermined area of the storage unit 26.

The vehicle 20 controls the image displayed on the display such that an acceleration in a direction different from the acquired acceleration direction can be experienced (S32). For example, when an acceleration toward the left has been acquired, the vehicle 20 displays a captured image to be displayed on the display, or the like, so as to be inclined toward the right with reference to the center of the image captured by the camera. Similarly, when an acceleration toward the right has been acquired, the vehicle 20 displays a captured image to be displayed on the display, or the like, so as to be inclined toward the left with reference to the center of the image captured by the camera. Furthermore, when an acceleration toward the front has been acquired, the vehicle 20 displays a captured image to be displayed on the display, or the like, so as to be inclined upward with reference to the center of the image captured by the camera. When an acceleration toward the rear has been acquired, the vehicle 20 displays a captured image to be displayed on the display, or the like, so as to be inclined downward with reference to the center of the image captured by the camera. After the process of S32, the process of FIG. 15 is ended.

Through the above processes, in the mobility support system 1 according to the second modification, the vehicle 20 is able to acquire information about an acceleration of the host vehicle while traveling through the sensor 21. The vehicle 20 is able to control the image displayed on the display such that an acceleration in a direction different from the acquired acceleration direction can be experienced in simulation. According to the mode of the second modification, a propagation, an advertisement, or a publicity on a region where a mobility service is provided can be effectively performed.

Other Embodiments

The above-described embodiment is only illustrative, and the disclosure of the present embodiment can be implemented with modifications as needed without departing from the purport of the disclosure. The processes and devices described in this disclosure may be freely implemented in combination without any technical contradiction.

A process described as the one that a single apparatus executes may be executed by a share of a plurality of apparatuses. Alternatively, processes described as the ones that different apparatuses execute may be executed by a single apparatus. In a computer system, what hardware configuration (server configuration) implements functions may be flexibly changed.

In the above-described embodiment, the description is made on the assumption that the vehicle 20 acquires facility information or event information, provided from the mobility support server 30. Instead of such a configuration, a system (the control unit 24, the storage unit 26, and another in-vehicle computer) provided in the vehicle 20 may include almost all or all the components of the mobility support system 1. In other words, the vehicle 20 may solely provide the functions of the mobility support system 1. In such a case, the in-vehicle computer of the vehicle 20 may have a facility information table, and the like, and solely execute the processes of FIG. 13 to FIG. 15.

A program for causing an information processing apparatus, another machine, or another apparatus (hereinafter, computer, or the like) to implement any one or some of the above-described functions may be recorded on a recording medium that is readable by the computer, or the like. The any one or some of the functions may be provided by causing the computer, or the like, to read and run the program on the recording medium.

A recording medium that is readable by the computer, or the like, means a recording medium that stores information, such as data and programs, electrically, magnetically, optically, mechanically, or by chemical action, and the information can be read by the computer, or the like. Of such recording media, examples of media removable from the computer, or the like, include a flexible disk, a magneto-optical disk, a CD-ROM, a CD-R/W, a DVD, a Blu-ray disc, a DAT, an 8 mm tape, and a memory card, such as a flash memory. Examples of recording media fixed to the computer, or the like, include a hard disk and a ROM.

What is claimed is:

1. A processing apparatus comprising:
circuitry configured to
acquire facility information containing an advertisement or publicity on a facility located along a travel route that a vehicle is scheduled to travel or a facility located within a predetermined range from the travel route, and while the vehicle is autonomously traveling along the travel route, the autonomous traveling including generating an operation plan from a current position of the vehicle as determined using signals received from a satellite positioning system to a destination position, sensing a travel status of the vehicle and an environment around the vehicle to acquire information required for the autonomous traveling while performing the autonomous traveling along the travel route, and causing the vehicle to autonomously travel by increasing or decreasing controlled amounts of a drive motor, an inverter, a brake, and a steering motor,
acquire event information about a predetermined event that a user who rides in the vehicle is scheduled to be involved in;
process an image of a first facility associated with the facility information and an image of a second facility present around the first facility based on the facility information, the image of the first facility and the image of the second facility having been captured by at least one camera that is included in the vehicle and is directed to surroundings of the vehicle;
simultaneously display the processed image of the first facility, the processed image of the second facility, an explanation of a relationship between the first facility and the second facility, an instruction image, and a character image on a display provided in the vehicle, the processed image of the first facility including a real world image of the first facility and the processed image of the second facility including a real world image of the second facility, wherein the instruction image includes an arrow from the processed image of the first facility to the processed image of the second facility, and the explanation of the relationship between the first facility and the second facility is displayed in a balloon of the character image; and
display the event information after displaying the processed image of the first facility and the processed image of the second facility on the display provided in the vehicle.

2. The processing apparatus according to claim 1, wherein:
processing the image of the first facility or the image of the second facility includes modifying a structure of the first facility or the second facility through predetermined image processing; and
the circuitry is further configured to adjust a degree to which the structure is modified through the predetermined image processing upon receiving input from the user.

3. The processing apparatus according to claim 1, wherein:
the processing apparatus is a processing apparatus provided in the vehicle; and
the circuitry is further configured to process the image of the first facility or the image of the second facility further based on the event information.

4. The processing apparatus according to claim 1, wherein:
the display is placed on an entire surface or part of a surface of an internal space of the vehicle; and
the circuitry is further configured to
acquire first information on an acceleration of the vehicle, and
control a captured image to be displayed on the display such that the user in the vehicle experiences an acceleration in a direction different from a direction of the acceleration indicated by the first information.

5. The processing apparatus according to claim 1, wherein:
the second facility is a facility associated with the first facility, or
the second facility is present in a region in which the first facility is present.

6. The processing apparatus according to claim 1, wherein at least one of:
processing the image of the first facility includes adding information to or removing information from the real world image of the first facility, or
processing the image of the second facility includes adding information to or removing information from the real world image of the second facility.

7. The processing apparatus according to claim 1, wherein at least one of:
processing the image of the first facility includes adding the facility information to the real world image of the first facility, and
processing the image of second facility includes adding the facility information to the real world image of the second facility.

8. The processing apparatus according to claim 1, wherein at least one of:
processing the image of the first facility includes processing the real world image of the first facility into an image viewed from eyes of a visitor of the first facility, and
processing the image of the second facility includes processing the real world image of the second facility into an image viewed from eyes of a visitor of the second facility.

9. The processing apparatus according to claim 1, wherein at least one of:
processing the image of the first facility includes processing the real world image of the first facility into an image viewed from eyes of a visitor who has passed through an entrance of the first facility, and
processing the image of the second facility includes processing the real world image of the second facility into an image viewed from eyes of a visitor who has passed through an entrance of the second facility.

10. A processing method comprising:
acquiring facility information containing an advertisement or publicity on a facility located along a travel route that a vehicle is scheduled to travel or a facility located within a predetermined range from the travel route; and
while the vehicle is autonomously traveling along the travel route, the autonomous traveling including generating an operation plan from a current position of the vehicle as determined using signals received from a satellite positioning system to a destination position, sensing a travel status of the vehicle and an environment around the vehicle to acquire information required for the autonomous traveling while performing the autonomous traveling along the travel route, and causing the vehicle to autonomously travel by increasing or decreasing controlled amounts of a drive motor, an inverter, a brake, and a steering motor,
acquiring event information about a predetermined event that a user who rides in the vehicle is scheduled to be involved in;
processing an image of a first facility associated with the facility information and an image of a second facility present around the first facility based on the facility information, the image of the first facility and the image of the second facility having been captured by at least one camera that is included in the vehicle and is directed to surroundings of the vehicle;
simultaneously displaying the processed image of the first facility, the processed image of the second facility, an explanation of a relationship between the first facility and the second facility, an instruction image, and a character image on a display provided in the vehicle, the processed image of the first facility including a real world image of the first facility and the processed image of the second facility including a real world image of the second facility, wherein the instruction image includes an arrow from the processed image of the first facility to the processed image of the second facility, and the explanation of the relationship between the first facility and the second facility is displayed in a balloon of the character image; and
displaying the event information after displaying the processed image of the first facility and the processed image of the second facility on the display provided in the vehicle.

11. A non-transitory computer readable medium storing a program causing a computer to execute instructions for:
acquiring facility information containing an advertisement or publicity on a facility located along a travel route that a vehicle is scheduled to travel or a facility located within a predetermined range from the travel route; and
while the vehicle is autonomously traveling along the travel route, the autonomous traveling including generating an operation plan from a current position of the vehicle as determined using signals received from a satellite positioning system to a destination position, sensing a travel status of the vehicle and an environment around the vehicle to acquire information required for the autonomous traveling while performing the autonomous traveling along the travel route, and causing the vehicle to autonomously travel by increasing or decreasing controlled amounts of a drive motor, an inverter, a brake, and a steering motor,
acquiring event information about a predetermined event that a user who rides in the vehicle is scheduled to be involved in;
processing an image of a first facility associated with the facility information and an image of a second facility present around the first facility based on the facility information, the image of the first facility and the image of the second facility having been captured by at least one camera that is included in the vehicle and is directed to surroundings of the vehicle;
simultaneously displaying the processed image of the first facility, the processed image of the second facility, an explanation of a relationship between the first facility and the second facility, an instruction image, and a character image on a display provided in the vehicle, the processed image of the first facility including a real world image of the first facility and the processed image of the second facility including a real world image of the second facility, wherein the instruction image includes an arrow from the processed image of the first facility to the processed image of the second facility, and the explanation of the relationship between the first facility and the second facility is displayed in a balloon of the character image; and displaying the event information after displaying the processed image of the first facility and the processed image of the second facility on the display provided in the vehicle.

\* \* \* \* \*